(12) United States Patent
Huang et al.

(10) Patent No.: US 12,327,400 B2
(45) Date of Patent: Jun. 10, 2025

(54) NEURAL NETWORK OPTIMIZATION METHOD AND APPARATUS

(71) Applicant: HUAWEI TECHNOLOGIES CO., LTD., Guangdong (CN)

(72) Inventors: Yimin Huang, Moscow (RU); Yujun Li, Shenzhen (CN); Zhenguo Li, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 17/975,436

(22) Filed: Oct. 27, 2022

(65) Prior Publication Data

US 2023/0048405 A1  Feb. 16, 2023

Related U.S. Application Data

(63) Continuation of application No. PCT/CN2021/081234, filed on Mar. 17, 2021.

(30) Foreign Application Priority Data

Apr. 30, 2020 (CN) .................... 202010367582.2

(51) Int. Cl.
*G06V 10/776* (2022.01)
*G06V 10/82* (2022.01)
(52) U.S. Cl.
CPC ............ *G06V 10/776* (2022.01); *G06V 10/82* (2022.01)
(58) Field of Classification Search
CPC ..... G06V 10/776; G06V 10/82; G06N 3/0985
See application file for complete search history.

(56) References Cited

U.S. PATENT DOCUMENTS 10,699,192 B1 * 6/2020 Kim .................. G06N 3/084
2019/0095785 A1  3/2019 Sarkar et al.

OTHER PUBLICATIONS

Ben Rabe, "Revisiting Random Search for Neural Network Hyperparameter Optimization", 2019 (7 Pages) (Year: 2019).*
(Continued)

*Primary Examiner* — David F Dunphy
(74) *Attorney, Agent, or Firm* — Fish & Richardson P.C.

(57) ABSTRACT

The present disclosure relates to neural network optimization methods and apparatuses in the field of artificial intelligence. One example method includes sampling preset hyperparameter search space to obtain multiple hyperparameter combinations. Multiple iterative evaluations are performed on the multiple hyperparameter combinations to obtain multiple performance results of each hyperparameter combination. Any iterative evaluation comprises obtaining at least one performance result of each hyperparameter combination, and if a hyperparameter combination meets a first preset condition, re-evaluating the hyperparameter combination to obtain a re-evaluated performance result of the hyperparameter combination. An optimal hyperparameter combination is determined. If the optimal hyperparameter combination does not meet a second preset condition, a preset model is updated, based on the multiple performance results of each hyperparameter combination, for next sampling. Or if the optimal hyperparameter combination meets a second preset condition, the optimal hyperparameter combination is used as a hyperparameter combination of a neural network.

20 Claims, 10 Drawing Sheets

(56) References Cited

OTHER PUBLICATIONS

Jia Wu et al, "Hyperparameter Optimization for Machine Learning Models Based on Bayesian Optimization", 2019, Journal of Electronic Science and Technology, vol. 17, No. 1, pp. 26-40 (15 Pages) (Year: 2019).*
Extended European Search Report in European Appln No. 21797025.0, dated Jun. 5, 2023, 11 pages.

* cited by examiner

| | Average precision AP | $AP_{50}$ | $AP_{75}$ | $AP_S$ | $AP_M$ | $AP_L$ | Average recall AR rate | $AR_{10}$ | $AR_{100}$ | $AR_S$ | $AR_M$ | $AR_L$ |
|---|---|---|---|---|---|---|---|---|---|---|---|---|
| Manual | 36.4 | 58.4 | 39.1 | 21.5 | 40.0 | 46.6 | 36.4 | 58.4 | 39.1 | 21.5 | 40.0 | 46.6 |
| Random search | 37.2 | 58.7 | 40.2 | 21.8 | 40.4 | 49.7 | 37.2 | 58.7 | 40.2 | 21.8 | 40.4 | 49.7 |
| Bayesian optimization and hyperband BOHB | 38.3 | 59.3 | 40.7 | 22.7 | 42.1 | 50.1 | 39.7 | 42.9 | 40.7 | 22.7 | 42.1 | 50.1 |
| This application | 38.9 | 60.2 | 41.3 | 23.7 | 42.2 | 50.5 | 42.0 | 43.9 | 42.8 | 89.8 | 46.1 | 56.4 |

FIG. 8

NEURAL NETWORK OPTIMIZATION METHOD AND APPARATUS

CROSS-REFERENCE TO RELATED APPLICATIONS

This application is a continuation of International Application No. PCT/CN2021/081234, filed on Mar. 17, 2021, which claims priority to Chinese Patent Application No. 202010367582.2, filed on Apr. 30, 2020. The disclosures of the aforementioned applications are hereby incorporated by reference in their entireties.

TECHNICAL FIELD

This application relates to the field of artificial intelligence, and in particular, to a neural network optimization method and apparatus.

BACKGROUND

In a current neural network, a parameter obtained without training is referred to as a hyperparameter. The hyperparameter is usually adjusted based on massive practical experience, so that performance of a neural network model is better (for example, accuracy of image classification is higher). For example, a deep neural network includes a plurality of neurons, and input data is transmitted from a neuron at an input end to a neuron at an output end by using a neuron at an intermediate layer. During neural network training, a weight of each neuron is optimized based on a value of a loss function, to reduce a value of the loss function output by an updated model. Therefore, the model may be obtained by using an algorithm to optimize a parameter. The hyperparameter is used to adjust an entire network training process, for example, a quantity of hidden layers in a neural network, a size of a kernel function, and a quantity of kernel functions. The hyperparameter does not directly participate in the training process. In the training process, the hyperparameter usually remains unchanged, but is critical to final performance of the neural network. Therefore, it is important to select an appropriate group of hyperparameters.

In the conventional technology, a valuable hyperparameter combination is evaluated by using, for example, a successive halving method. In a process of selecting an appropriate hyperparameter combination, half of hyperparameter combinations with poor performance are discarded every time a plurality of hyperparameters are evaluated. As a result, there are few efficient hyperparameter combinations. In addition, a quantity of times of evaluating hyperparameter combinations is small. Consequently, evaluation results of the hyperparameter combinations may be inaccurate due to an error in some evaluations. Further, an optimal hyperparameter combination finally determined based on an inaccurate evaluation result is inaccurate.

SUMMARY

This application discloses a neural network optimization method and apparatus in the field of artificial intelligence, to efficiently and accurately determine a hyperparameter combination of a neural network.

According to a first aspect, this application provides a neural network optimization method, including: sampling hyperparameter search space, to obtain a plurality of hyperparameter combinations, where the hyperparameter search space includes a hyperparameter of a neural network, and the hyperparameter indicates a parameter, of the neural network, obtained without training; performing a plurality of iterative evaluations on the plurality of hyperparameter combinations, to obtain a plurality of performance results of each of the plurality of hyperparameter combinations, where the plurality of performance results are determined based on a result output by the neural network after each hyperparameter combination is substituted into the neural network; in any one of the plurality of iterative evaluations, obtaining at least one performance result of each hyperparameter combination that is obtained through evaluation before a current evaluation, where the at least one performance result of each hyperparameter combination is included in the plurality of performance results of each hyperparameter combination; and if a hyperparameter combination in the plurality of hyperparameter combinations meets a first preset condition, re-evaluating the hyperparameter combination that meets the first preset condition, to obtain a re-evaluated performance result of the hyperparameter combination that meets the first preset condition, where the re-evaluated performance result is included in a plurality of performance results of the hyperparameter combination that meets the first preset condition; determining an optimal hyperparameter combination from the plurality of hyperparameter combinations based on the plurality of performance results of each hyperparameter combination; and if the optimal hyperparameter combination does not meet a second preset condition, updating a preset model based on the plurality of performance results of each hyperparameter combination, where the preset model is used to fit probability distribution, and the probability distribution is used to resample the hyperparameter search space; or if the optimal hyperparameter combination meets a second preset condition, using the optimal hyperparameter combination as a hyperparameter combination of the neural network.

Therefore, in this implementation of this application, when the plurality of hyperparameter combinations are evaluated, the hyperparameter combination that meets the first preset condition may be re-evaluated, instead of focusing only on a performance result of the optimal hyperparameter in the plurality of hyperparameter combinations. Therefore, more performance results of a hyperparameter combination without optimal performance may be obtained, and accuracy of an overall performance result of the plurality of obtained hyperparameter combinations is improved. Therefore, the probability distribution corresponding to the preset model is also more reliable, where the preset model that is updated based on the overall performance result of the plurality of hyperparameter combinations is more accurate. This enables the hyperparameter combination obtained through resampling based on the preset model to be more similar to the optimal combination, and performance of the finally determined optimal hyperparameter combination to be better. In addition, the model is updated based on the overall performance result of the plurality of hyperparameter combinations that is more accurate. This enables the preset model to converge quickly, and improves convergence efficiency, to accurately and efficiently determine a hyperparameter combination with better performance.

In a possible implementation, any one of the iterative evaluations may further include: selecting a second hyperparameter combination from the plurality of hyperparameter combinations based on the at least one performance result of each hyperparameter combination, where the second hyperparameter combination is a hyperparameter combination with optimal performance in the plurality of hyperparameter combinations, or the second hyperparameter combination is a hyperparameter combination with a largest quantity of evaluations in the plurality of hyperparameter combinations. Correspondingly, the first preset condition may include: a quantity of times of evaluating the first hyperparameter combination is not greater than a preset quantity of times, and the quantity of times of evaluating the first hyperparameter combination is not greater than a quantity of times of evaluating the second hyperparameter combination; or a quantity of times of evaluating the first hyperparameter combination is greater than a preset quantity of times, the quantity of times of evaluating the first hyperparameter combination is not greater than a quantity of times of evaluating the second hyperparameter combination, and some performance results of the second hyperparameter combination are worse than at least one performance result of the first hyperparameter combination. It may be understood that, in any iterative evaluation, before it is determined whether a first hyperparameter that meets the first preset condition exists in the plurality of hyperparameter combinations, the second hyperparameter combination is further selected from the plurality of hyperparameter combinations, and the first preset condition is determined based on at least one performance result of the second hyperparameter.

Therefore, in this implementation of this application, a hyperparameter combination whose performance results are better than some performance results of the second hyperparameter combination may also be re-evaluated, or a hyperparameter combination whose quantity of evaluations is excessively low may also be re-evaluated. This can increase a quantity of performance results of some hyperparameter combinations without optimal performance or whose quantity of evaluations is small, and improve accuracy of an overall performance result of the plurality of hyperparameter combinations.

In a possible implementation, any one of the plurality of iterative evaluations may further include: if the first hyperparameter combination in the plurality of hyperparameter combinations does not meet the first preset condition, re-evaluating the second hyperparameter combination, to obtain a re-evaluated performance result of the second hyperparameter combination, where the re-evaluated performance result of the second hyperparameter combination is included in a plurality of performance results of the second hyperparameter combination.

In this implementation of this application, when iterative evaluation is performed on the plurality of hyperparameter combinations, the second hyperparameter combination with optimal performance or with a largest quantity of evaluations in the plurality of hyperparameter combinations may be determined. If a hyperparameter combination that meets the first preset condition exists, the hyperparameter combination that meets the first preset condition is re-evaluated. If a hyperparameter combination that meets the first preset condition does not exist, the second hyperparameter combination is evaluated. Therefore, this embodiment of this application is not limited to focusing on the second hyperparameter combination with optimal performance in the plurality of hyperparameter combinations, and another hyperparameter combination that meets the first preset condition in the plurality of hyperparameter combinations is also re-evaluated. Therefore, an overall performance result of the plurality of hyperparameter combinations is more accurate, the updated preset model is also more reliable, where the preset model is updated based on the performance results of the plurality of hyperparameters whose overall performance is more accurate. In addition, a hyperparameter combination obtained through resampling is more similar to an optimal combination.

In a possible implementation, the determining a second hyperparameter combination from the plurality of hyperparameter combinations may include: determining, from the plurality of hyperparameter combinations, a hyperparameter combination with a largest quantity of evaluations as the second hyperparameter combination; or if a plurality of hyperparameter combinations with a largest quantity of evaluations exist in the plurality of hyperparameter combinations, determining, from the plurality of hyperparameter combinations with a largest quantity of evaluations, at least one hyperparameter combination with optimal performance as the second hyperparameter combination.

Therefore, in this implementation of this application, a plurality of selection manners are provided. A hyperparameter combination with a largest quantity of evaluations or a hyperparameter combination with optimal performance may be selected from the plurality of hyperparameter combinations as the optimal second hyperparameter combination.

In a possible implementation, in this implementation of this application, in each iterative evaluation, each hyperparameter combination may be evaluated, and one or more performance results obtained through evaluating each hyperparameter combination before the current evaluation are obtained. The obtaining at least one performance result of each hyperparameter combination may also be directly obtaining all evaluation results obtained before the current iterative evaluation, to obtain the at least one performance result of each hyperparameter combination. Therefore, this application provides a plurality of iterative evaluation manners. This can increase a data amount of the performance results of the hyperparameter combinations, and improve accuracy of an overall performance result of the plurality of hyperparameter combinations.

In a possible implementation, the preset model includes a first probability density function and a second probability density function, and the updating a preset model based on the plurality of performance results of each hyperparameter combination may include: classifying the plurality of hyperparameter combinations into a first-type hyperparameter combination and a second-type hyperparameter combination based on the plurality of performance results of each hyperparameter combination, where performance of the first-type hyperparameter combination is better than performance of the second-type hyperparameter combination, the performance of the first-type hyperparameter combination is determined based on a plurality of performance results of the first-type hyperparameter combination, and the performance of the second-type hyperparameter combination is determined based on a plurality of performance results of the second-type hyperparameter combination; and updating the first probability density function based on the first-type hyper-parameter combination, and updating the second probability density function based on the second-type hyperparameter combination.

In this implementation of this application, the first probability density function may be updated based on the first-type hyper-parameter combination with better performance, and the second probability density function may be updated based on the second-type hyper-parameter combination with worse performance. A probability of resampling the hyperparameter search space complies with the probability distribution determined by the preset model. Therefore, the first probability density function is updated based on the hyperparameter combination with better performance, to enable a probability corresponding to the first probability density function to be more accurate. This can achieve a better performance result of a recollected hyperparameter combination, improve a convergence speed of the model, and improve accuracy of the overall performance result of the plurality of hyperparameter combinations.

In a possible implementation, a type of the first probability density function or the second probability density function may include one or more of the following: normal distribution, discrete distribution, truncated normal distribution, or log-normal distribution. In this implementation of this application, the probability density function may be a plurality of models, and the probability density functions may be selected based on different scenarios.

In a possible implementation, the neural network is a convolutional neural network for recognizing an image, a type of the hyperparameter in the hyperparameter search space includes one or more of the following: a quantity of convolutional layers, a quantity of convolution kernels, an expansion size, a location of a rectified linear unit (rectified linear unit, ReLU) function in the neural network, a size of an anchor box, or a ratio of a length to a width of an anchor box, and the anchor box is used to identify an object that needs to be recognized in an image. In this implementation of this application, an optimal hyperparameter combination of the convolutional neural network may be determined, to obtain a convolutional neural network with higher accuracy.

In a possible implementation, the neural network is obtained through combining one or more construction units, and the type of the hyperparameter in the hyperparameter search space includes one or more of the following: a quantity of network layers of one construction unit, a quantity of neurons at each network layer of a construction unit, or an operation operator of each neuron in a construction unit. Therefore, according to the neural network optimization method provided in this application, a better construction unit can be found, to obtain a neural network with better performance.

In a possible implementation, the plurality of performance results include classification precision or a loss value, the classification precision indicates accuracy of image recognition by the neural network, and the loss value is a value of a loss function corresponding to the neural network. The second preset condition includes: the classification precision in any one of the plurality of performance results is greater than a first threshold, an average value of the classification precision included in the plurality of performance results is greater than a second threshold, the loss value is not greater than a third threshold, or the like.

Therefore, in this implementation of this application, the performance result of the hyperparameter may be measured based on the classification precision, the loss value, or the like, and an optimal hyperparameter combination is determined based on the classification precision, the loss value, or the like.

In a possible implementation, the sampling hyperparameter search space, to obtain a plurality of hyperparameter combinations may include: randomly sampling the hyperparameter search space, to obtain the plurality of hyperparameter combinations; or sampling the hyperparameter search space based on the probability distribution determined by the preset model, to obtain the plurality of hyperparameter combinations, where the preset model is the model that is not updated.

In this implementation of this application, the hyperparameter search space may be randomly sampled, for example, sampling the hyperparameter search space for the first time, or sampled based on the probability distribution determined by the preset model. A plurality of manners are provided to obtain the plurality of hyperparameter combinations.

According to a second aspect, this application provides a neural network optimization apparatus. The neural network optimization apparatus includes:
   a sampling module, configured to sample hyperparameter search space, to obtain a plurality of hyperparameter combinations, where the hyperparameter search space includes a hyperparameter of a neural network, and the hyperparameter indicates a parameter, of the neural network, obtained without training;
   an evaluation module, configured to: perform a plurality of iterative evaluations on the plurality of hyperparameter combinations, to obtain a plurality of performance results of each of the plurality of hyperparameter combinations, where the plurality of performance results are determined based on a result output by the neural network after each hyperparameter combination is substituted into the neural network; in any one of the plurality of iterative evaluations, obtain at least one performance result of each hyperparameter combination that is obtained through evaluation before a current evaluation; and if a first hyperparameter combination in the plurality of hyperparameter combinations meets a first preset condition, re-evaluate the first hyperparameter combination, to obtain a re-evaluated performance result of the first hyperparameter combination, where the re-evaluated performance result is included in a plurality of performance results of the first hyperparameter combination;
   a determining module, configured to determine an optimal hyperparameter combination from the plurality of hyperparameter combinations based on the plurality of performance results of each hyperparameter combination;
   an updating module, configured to: if the optimal hyperparameter combination does not meet a second preset condition, update a preset model based on the plurality of performance results of each hyperparameter combination, where the preset model is used to fit probability distribution, and the probability distribution is used to resample the hyperparameter search space; and
   a selection module, configured to: if the optimal hyperparameter combination meets a second preset condition, use the optimal hyperparameter combination as a hyperparameter combination of the neural network.

For beneficial effects generated by any one of the second aspect and the possible implementations of the second aspect, refer to the descriptions of any one of the first aspect and the possible implementations of the first aspect.

In a possible implementation, the first preset condition includes: a quantity of times of evaluating the first hyperparameter combination is not greater than a preset quantity of times, and the quantity of times of evaluating the first hyperparameter combination is not greater than a quantity of times of evaluating a second hyperparameter combination, where the second hyperparameter combination is a hyperparameter combination with optimal performance in the plurality of hyperparameter combinations that is selected in any iterative evaluation, or a hyperparameter combination with a largest quantity of evaluations in the plurality of hyperparameter combinations, that is, in any iterative evaluation, the second hyperparameter combination further needs to be selected before whether the first hyperparameter combination meets the first preset condition exists is determined;

or a quantity of times of evaluating the first hyperparameter combination is greater than a preset quantity of times, the quantity of times of evaluating the first hyperparameter combination is not greater than a quantity of times of evaluating the second hyperparameter combination, and some performance results of the second hyperparameter combination are worse than at least one performance result of the first hyperparameter combination.

In a possible implementation, the evaluation module may further include: if the first hyperparameter combination in the plurality of hyperparameter combinations does not meet the first preset condition, re-evaluating the second hyperparameter combination, to obtain a re-evaluated performance result of the second hyperparameter combination.

In a possible implementation, the preset model includes a first probability density function and a second probability density function, and the updating module is specifically configured to: classify the plurality of hyperparameter combinations into a first-type hyperparameter combination and a second-type hyperparameter combination based on the at least one performance result of each hyperparameter combination, where performance of the first-type hyperparameter combination is better than performance of the second-type hyperparameter combination, the performance of the first-type hyperparameter combination is determined based on a plurality of performance results of the first-type hyperparameter combination, and the performance of the second-type hyperparameter combination is determined based on a plurality of performance results of the second-type hyperparameter combination; and update the first probability density function based on the first-type hyper-parameter combination, and update the second probability density function based on the second-type hyper-parameter combination.

In a possible implementation, a type of the first probability density function or the second probability density function may include one or more of the following: normal distribution, discrete distribution, truncated normal distribution, or log-normal distribution.

In a possible implementation, the neural network is a convolutional neural network for recognizing an image, a type of the hyperparameter in the hyperparameter search space includes one or more of the following: a quantity of convolutional layers, a quantity of convolution kernels, an expansion size, a location of a ReLU function in the neural network, a size of an anchor box, or a ratio of a length to a width of an anchor box, and the anchor box is used to identify an object that needs to be recognized in an image.

In a possible implementation, the neural network is obtained through combining one or more construction units, and the type of the hyperparameter in the hyperparameter search space includes one or more of the following: a quantity of network layers of one construction unit, a quantity of neurons at each network layer of a construction unit, or an operation operator of each neuron in a construction unit.

In a possible implementation, the plurality of performance results include classification precision or a loss value, the classification precision indicates accuracy of image recognition by the neural network, and the loss value is a value of a loss function corresponding to the neural network. The second preset condition includes: the classification precision in any one of the plurality of performance results is greater than a first threshold, an average value of the classification precision included in the plurality of performance results is greater than a second threshold, or the loss value is not greater than a third threshold.

In a possible implementation, the sampling module is specifically configured to: randomly sample the hyperparameter search space, to obtain the plurality of hyperparameter combinations; or sample the hyperparameter search space based on the probability distribution determined by the preset model, to obtain the plurality of hyperparameter combinations.

According to a third aspect, this application provides a neural network optimization apparatus, including a processor and a memory. The processor and the memory are interconnected through a line, and the processor invokes program code in the memory to perform a processing-related function in the neural network optimization method in any one of the first aspect. Optionally, the neural network optimization apparatus may be a chip.

According to a fourth aspect, an embodiment of this application provides a neural network optimization apparatus. The neural network optimization apparatus may also be referred to as a digital processing chip or a chip. The chip includes a processing unit and a communication interface. The processing unit obtains program instructions through the communication interface, and when the program instructions are executed by the processing unit, the processing unit is configured to perform a processing-related function in any one of the first aspect or the optional implementations of the first aspect.

According to a fifth aspect, an embodiment of this application provides a computer-readable storage medium including instructions. When the instructions are run on a computer, the computer is enabled to perform the method in any one of the first aspect or the optional implementations of the first aspect.

According to a sixth aspect, an embodiment of this application provides a computer program product including instructions. When the computer program product is run on a computer, the computer is enabled to perform the method in any one of the first aspect or the optional implementations of the first aspect.

DESCRIPTION OF DRAWINGS

FIG. 8 is a schematic diagram of accuracy of a neural network optimization method according to an embodiment of this application;

DESCRIPTION OF EMBODIMENTS

The following describes technical solutions in embodiments of this application with reference to the accompanying drawings in embodiments of this application. It is clear that the described embodiments are merely a part rather than all of embodiments of this application. All other embodiments obtained by a person of ordinary skill in the art based on the embodiments of this application without creative efforts shall fall within the protection scope of this application.

A neural network optimization method provided in this application may be applied to an artificial intelligence (artificial intelligence, AI) scenario. AI is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, the artificial intelligence is a branch of computer science, and is intended to understand essence of intelligence and produce a new intelligent machine that can react in a manner similar to the human intelligence. The artificial intelligence is to study design principles and implementation methods of various intelligent machines, so that the machines have perceiving, inference, and decision-making functions. Researches in the artificial intelligence field include a robot, natural language processing, computer vision, decision-making and inference, human-computer interaction, recommendation and search, an AI basic theory, and the like.

Figure 1:
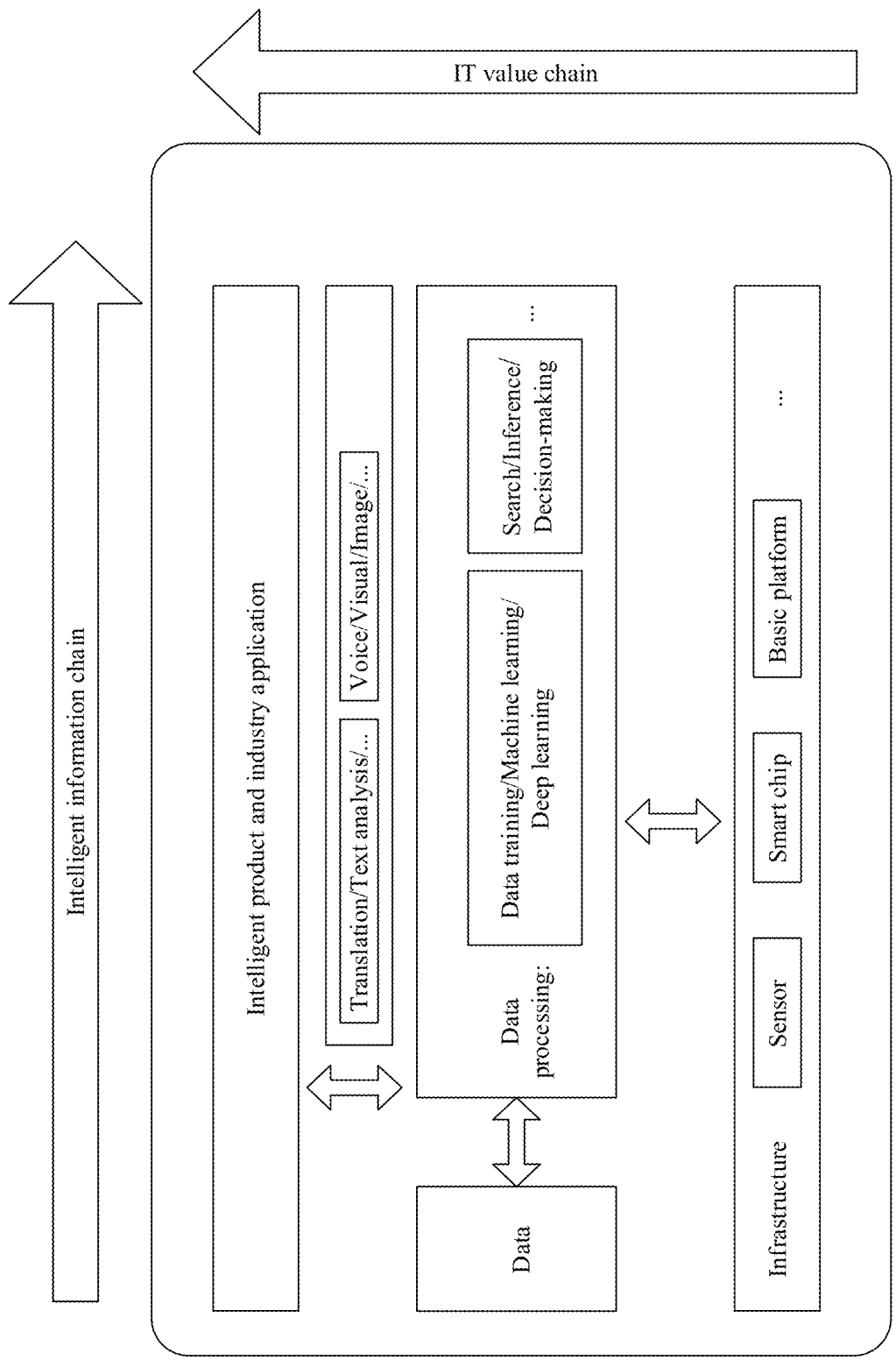
FIG. 1 is a schematic diagram of an artificial intelligence main framework applied to this application.

FIG. 1 is a schematic diagram of an artificial intelligence main framework. The main framework describes an overall working procedure of an artificial intelligence system, and is applicable to a requirement of a general artificial intelligence field.

The following describes the artificial intelligence main framework from two dimensions: an "intelligent information chain" (a horizontal axis) and an "IT value chain" (a vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, data undergoes a condensation process of "data-information-knowledge-wisdom".

The "IT value chain" reflects a value brought by artificial intelligence to the information technology industry from an underlying infrastructure and information (providing and processing technology implementation) of human intelligence to an industrial ecological process of a system.

(1) Infrastructure

The infrastructure provides computing capability support for the artificial intelligence system, implements communication with the external world, and implements support by using a basic platform. The infrastructure communicates with the outside by using a sensor. A computing capability is provided by a smart chip, for example, a hardware acceleration chip such as a central processing unit (central processing unit, CPU), a neural network processing unit (neural-network processing unit, NPU), a graphics processing unit (graphics processing unit, GPU), an application-specific integrated circuit (application-specific integrated circuit, ASIC), or a field programmable gate array (field programmable gate array, FPGA). The basic platform of the infrastructure includes related platforms, for example, a distributed computing framework and a network, for assurance and support, including cloud storage and computing, an interconnection network, and the like. For example, the sensor communicates with the outside to obtain data, and the data is provided to a smart chip in a distributed computing system provided by the basic platform for computing.

(2) Data

Data at an upper layer of the infrastructure is used to indicate a data source in the field of artificial intelligence. The data relates to a graph, an image, a voice, and text, further relates to internet of things data of a conventional device, and includes service data of an existing system and perception data such as force, displacement, a liquid level, a temperature, and humidity.

(3) Data Processing

Data processing usually includes manners such as data training, machine learning, deep learning, searching, inference, and decision-making.

Machine learning and deep learning may mean performing symbolic and formalized intelligent information modeling, extraction, preprocessing, training, and the like on data.

Inference is a process in which a human intelligent inferring manner is simulated in a computer or an intelligent system, and machine thinking and problem resolving are performed by using formal information according to an inferring control policy. A typical function is searching and matching.

Decision-making is a process in which a decision is made after intelligent information is inferred, and usually provides functions such as classification, ranking, and prediction.

(4) General Capabilities

After data processing mentioned above is performed on data, some general capabilities may further be formed based on a data processing result, for example, an algorithm or a general system, such as translation, text analysis, computer vision processing, speech recognition, and image recognition.

(5) Intelligent Product and Industry Application

The intelligent product and the industry application are a product and an application of the artificial intelligence system in various fields, and are package of an overall solution of the artificial intelligence, so that decision-making for intelligent information is productized and an application is implemented. Application fields mainly include smart manufacturing, smart transportation, smart home, smart health care, smart security protection, autonomous driving, a safe city, a smart terminal, and the like.

In the foregoing scenarios, the neural network, as an important node, is used to implement machine learning, deep learning, searching, inference, decision-making, and the like. The neural network mentioned in this application may include a plurality of types, for example, a deep neural network (deep neural network, DNN), a convolutional neural network (convolutional neural network, CNN), a recurrent neural network (recurrent neural network, RNN), a residual network, or another neural network. The following describes some neural networks as examples.

The neural network may include a neuron. The neuron may be an operation unit that uses $x_s$ and an intercept of 1 as an input. For example, an output of the operation unit may be $h_{w,b}(x)=f(W^T x)=f(\Sigma_{s=1}^{n} W_s x_s + b)$, where $s=1, 2, \ldots,$ or n, n is a natural number greater than 1, $W_s$ is a weight of $x_s$, and b is bias of the neuron. f is an activation function (activation function) of the neuron, used to introduce a non-linear feature into the neural network, to convert an input signal in the neuron into an output signal. The output signal of the activation function may serve as an input of a next convolution layer. The activation function may be a function such as sigmoid, a rectified linear unit (rectified linear unit, ReLU), or tan h. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

The convolutional neural network (convolutional neural network, CNN) is a deep neural network with a convolutional structure. The convolutional neural network includes a feature extractor including a convolution layer and a sub-sampling layer. The feature extractor may be considered as a filter. A convolution process may be considered as performing convolution by using a trainable filter and an input image or a convolution feature map (feature map). The convolutional layer is a neuron layer that is in the convolutional neural network and at which convolution processing is performed on an input signal. At the convolutional layer of the convolutional neural network, one neuron may be connected to only a part of neurons at a neighboring layer. A convolutional layer usually includes several feature planes, and each feature plane may include some neurons arranged in a rectangle. Neurons of a same feature plane share a weight, and the shared weight herein is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, image information obtained through same learning can be used for all locations in the image. At a same convolutional layer, a plurality of convolution kernels may be used to extract different image information. Usually, a larger quantity of convolution kernels indicates richer image information reflected by a convolution operation.

The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

The convolutional neural network may correct a value of a parameter in an initial super-resolution model in a training process according to an error back propagation (back propagation, BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

For example, the following uses a convolutional neural network (convolutional neural network, CNN) as an example.

CNN is a deep neural network with a convolutional structure, and is a deep learning (deep learning) architecture. In the deep learning architecture, multi-layer learning is performed at different abstract levels by using a machine learning algorithm. As the deep learning architecture, the CNN is a feed-forward (feed-forward) artificial neural network. Neurons in the feed-forward artificial neural network respond to an overlapping region in an image input to the CNN.

Figure 2:
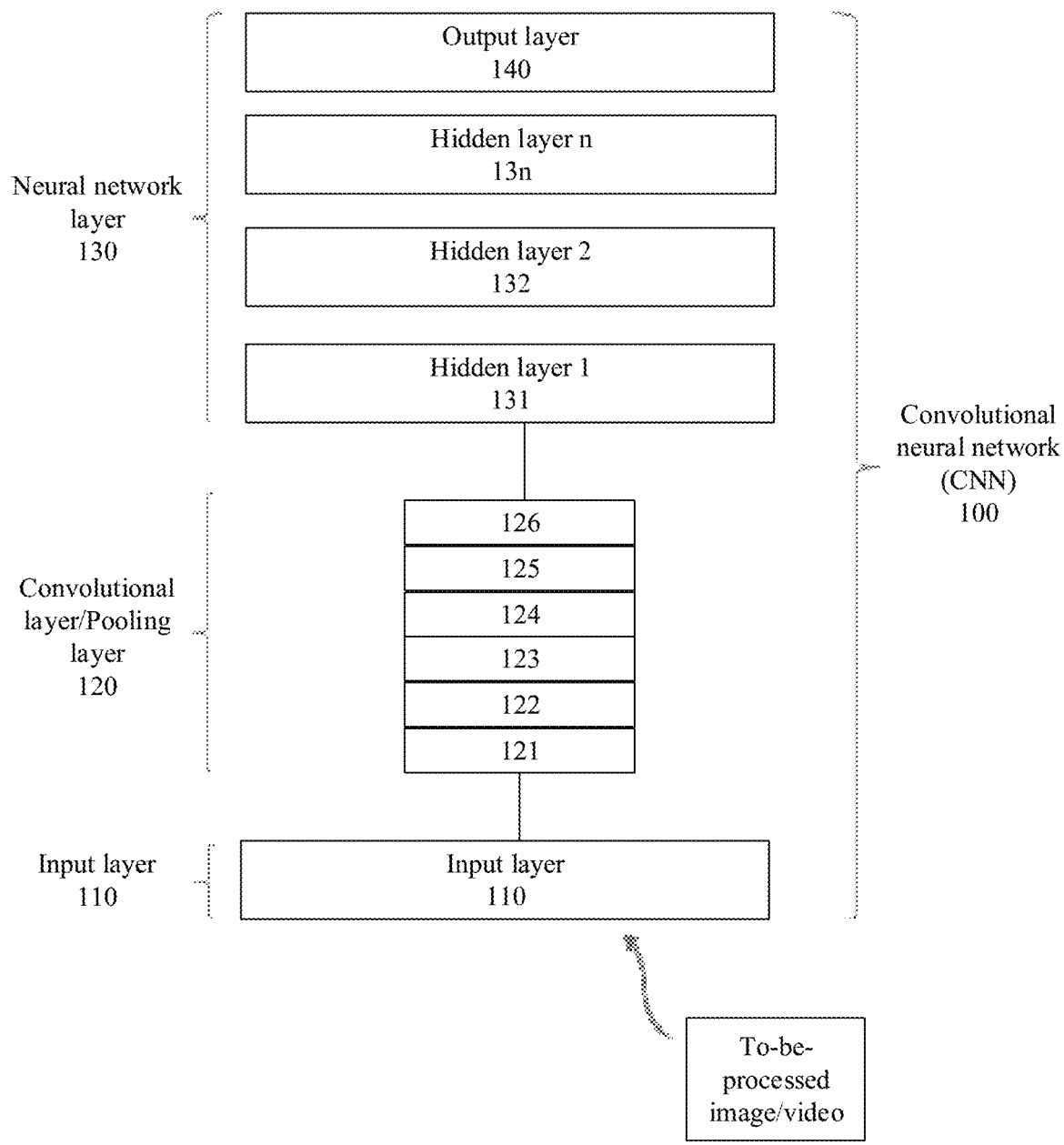
FIG. 2 is a schematic diagram of a structure of a convolutional neural network according to an embodiment of this application.

As shown in FIG. 2, a convolutional neural network (CNN) 100 may include an input layer 110, a convolutional layer/pooling layer 120, and a neural network layer 130. The pooling layer is optional.

As shown in FIG. 2, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layer 121 and the layer 122 are convolutional layers, the layer 123 is a pooling layer, the layer 124 and the layer 125 are convolutional layers, and the layer 126 is a pooling layer. To be specific, an output of a convolutional layer may be used as an input of a subsequent pooling layer, or may be used as an input of another convolutional layer to continue to perform a convolution operation.

The convolutional layer 121 is used as an example. The convolutional layer 121 may include a plurality of convolution operators. The convolution operator is also referred to as a kernel. In image processing, the convolution operator functions as a filter that extracts specific information from an input image matrix. The convolution operator may be a weight matrix essentially, and the weight matrix is usually predefined. In a process of performing a convolution operation on an image, the weight matrix usually processes pixels at a granularity level of one pixel (or two pixels, depending on a value of a stride (stride)) in a horizontal direction on an input image, to extract a specific feature from the image. A size of the weight matrix is related to a size of the image. It should be noted that a depth dimension (depth dimension) of the weight matrix is the same as a depth dimension of the input image. In a convolution operation process, the weight matrix extends to an entire depth of the input image. Therefore, a convolution output of a single depth dimension is generated by performing convolution with a single weight matrix. However, in most cases, a plurality of weight matrices of a same dimension rather than the single weight matrix are used. Outputs of the weight matrices are stacked to form a depth dimension of a convolutional image. Different weight matrices may be used to extract different features from the image. For example, one weight matrix is used to extract edge information of the image, another weight matrix is used to extract a specific color of the image, and a further weight matrix is used to blur unneeded noise in the image. The plurality of weight matrices have the same dimension, and feature maps extracted from the plurality of weight matrices with the same dimension have a same dimension. Then, the plurality of extracted feature maps with the same dimension are combined to form an output of the convolution operation.

Weight values in the weight matrices need to be obtained through massive training in an actual application. Each weight matrix formed by using the weight values obtained through training may be used to extract information from the input picture, to enable the convolutional neural network 100 to perform correct prediction.

When the convolutional neural network 100 includes a plurality of convolutional layers, a larger quantity of general features are usually extracted at an initial convolutional layer (for example, the convolutional layer 121). The general features may be also referred to as low-level features. As a depth of the convolutional neural network 100 increases, a feature extracted at a more subsequent convolutional layer (for example, the convolutional layer 126) is more complex, for example, a high-level semantic feature. A feature with higher semantics is more applicable to a to-be-resolved problem.

Pooling Layer

Because a quantity of training parameters usually needs to be reduced, a pooling layer usually needs to be periodically introduced after a convolutional layer. To be specific, for the layers 121 to 126 in the layer 120 the shown in FIG. 2, one convolutional layer may be followed by one pooling layer, or a plurality of convolutional layers may be followed by one or more pooling layers. During picture processing, the pooling layer is only used to reduce a space size of the picture. The pooling layer may include an average pooling operator and/or a maximum pooling operator, to perform sampling on the input image to obtain an image with a small size. The average pooling operator may compute a pixel value in the image within a specific range, to generate an average value. The maximum pooling operator may be used to select a pixel with a maximum value in a specific range as a maximum pooling result. In addition, similar to a case in which a size of a weight matrix in the convolutional layer should be related to a size of the image, an operator in the pooling layer should be also related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 130

After processing is performed at the convolutional layer/pooling layer 120, the convolutional neural network 100 still cannot output required output information. As described above, at the convolutional layer/pooling layer 120, only a feature is extracted, and parameters resulting from an input image are reduced. However, to generate final output information (required class information or other related information), the convolutional neural network 100 needs to use the neural network layer 130 to generate an output of one required class or outputs of a group of required classes. Therefore, the neural network layer 130 may include a plurality of hidden layers (131 and 132 to 13$n$ shown in FIG. 2) and an output layer 140. In this application, the convolutional neural network is obtained through searching a super unit for at least one first construction unit based on an output of a delay prediction model as a constraint condition, and stacking the at least one first construction unit. The convolutional neural network may be used for image recognition, image classification, super-resolution image reconstruction, and the like.

At the neural network layer 130, the plurality of hidden layers are followed by the output layer 140, that is, the last layer of the entire convolutional neural network 100. The output layer 140 has a loss function similar to a categorical cross entropy, and the loss function is specifically configured to calculate a prediction error. Once forward propagation (for example, propagation from 110 to 140 in FIG. 2 is forward propagation) of the entire convolutional neural network 100 is completed, reverse propagation (for example, propagation from 140 to 110 in FIG. 2 is reverse propagation) is started to update a weight value and a deviation of each layer mentioned above, to reduce a loss of the convolutional neural network 100 and an error between a result output by the convolutional neural network 100 by using the output layer and an ideal result.

It should be noted that the convolutional neural network 100 shown in FIG. 2 is merely used as an example of a convolutional neural network. During specific application, the convolutional neural network may alternatively exist in a form of another network model, for example, a plurality of parallel convolutional layers/pooling layers shown in FIG. 3, and extracted features are all input to the entire neural network layer 130 for processing.

In the neural network, some parameters need to be determined through training, and some parameters need to be determined before training. The following describes some parameters related to the neural network.

A hyperparameter (hyperparameter) is a parameter whose value is set before a learning process starts, and a parameter that is not obtained through training. The hyperparameter is used to adjust a neural network training process, for example, a quantity of hidden layers in a convolutional neural network, a size of a kernel function, and a quantity of kernel functions. The hyperparameter is not directly used in the training process, but only for configuring a variable. It should be noted that in the training process, the hyperparameter usually remains unchanged. Various neural networks are trained based on data and a learning algorithm, to obtain a model that can be used for prediction and estimation. If performance of the model is poor, experienced personnel adjust a network structure. A parameter that is not obtained through training, for example, a learning rate in an algorithm or a quantity of samples in each batch, is usually referred to as a hyperparameter. Usually, the hyperparameter is adjusted based on a large amount of practical experience, so that a neural network model performs better until an output of the neural network meets a requirement. A group of hyperparameter combinations mentioned in this application includes values of all or some hyperparameters of the neural network. Usually, a neural network includes a plurality of neurons, and input data is transmitted to an output end by using the neurons. During neural network training, a weight of each neuron is optimized based on a value of a loss function, to reduce a value of the loss function. Therefore, the model may be obtained by using an algorithm to optimize a parameter. The hyperparameter is used to adjust an entire network training process, for example, a quantity of hidden layers in the convolutional neural network, a size of a kernel function, or a quantity of kernel functions. The hyperparameter is not directly used in the training process, but only for configuring a variable.

An optimizer is configured to optimize a parameter, for example, a network weight, of a machine learning algorithm. The parameter may be optimized according to an optimization algorithm, for example, a gradient descent algorithm, a stochastic gradient descent algorithm, or an adaptive moment estimation (adaptive moment estimation, Adam) algorithm.

A learning rate indicates amplitude of updating a parameter in each iteration in the optimization algorithm, and is also referred to as a stride. If the stride is too large, the algorithm does not converge, and a target function of the model is unstable. If the stride is too small, a convergence speed of the model is too slow.

An activation function is a non-linear function added to each neuron, namely, a key to a non-linear property of a neural network. Common activation functions may include functions such as a sigmoid function, a rectified linear unit (rectified linear unit, ReLU) function, and a tan h function.

A loss function is a target function in a parameter optimization process. Usually, a smaller value of the loss function indicates a more accurate output result of the model, and a model training process is a process of minimizing the loss function. Common loss functions may include a logarithmic loss function, a square loss function, an exponential loss function, and the like.

Usually, Bayesian optimization may be used to select an optimal hyperparameter suitable for a neural network from a plurality of groups of hyperparameters. For example, a process of Bayesian optimization may include: first setting an initial model; then selecting a hyperparameter combination of the model that is most likely to meet a preset condition; detecting whether the hyperparameter combination meets the preset condition; and if the hyperparameter combination meets the preset condition, stopping the process, and outputting the hyperparameter combination that meets the preset condition; or if the hyperparameter combination does not meet the preset condition, correcting the model based on the group of new data, and continuing to perform a next iteration. For example, in a common Bayesian process, hyperparameter search space is sampled, to obtain a plurality of hyperparameter combinations, each hyperparameter combination is evaluated, half of the hyperparameter combinations with a poor performance result are discarded, and half of the hyperparameter combinations with a good performance result continue to be evaluated. Then, half of the hyperparameter combinations with a poor performance result are discarded until computing resources are exhausted, and a hyperparameter combination with optimal performance is determined from the plurality of hyperparameter combinations. If the hyperparameter combination does not meet a requirement, the model continues to be corrected based on evaluation results of the plurality of hyperparameter combinations. The hyperparameter search space is sampled again based on the model, to obtain a plurality of hyperparameter combinations, and the hyperparameter combination are re-evaluated until a hyperparameter combination whose performance result meets the requirement is selected. It should be noted that, in the following implementations of this application, this manner is referred to as Bayesian optimization and hyperband (Bayesian optimization and hyperband, BOHB). Details are not described below again. However, in a process of selecting an appropriate hyperparameter combination, half of hyperparameter combinations with a poor performance result are discarded each time in a process of evaluating a plurality of hyperparameter combinations. As a result, a quantity of valid hyperparameter combinations is small, and a performance result of a discarded hyperparameter combination may be inaccurate. Reliability of the model obtained through updating based on the inaccurate performance result is low, and an optimal hyperparameter combination cannot be found.

Therefore, this application provides a neural network optimization method, to efficiently and accurately determine a hyperparameter combination of a neural network.

Figure 4:
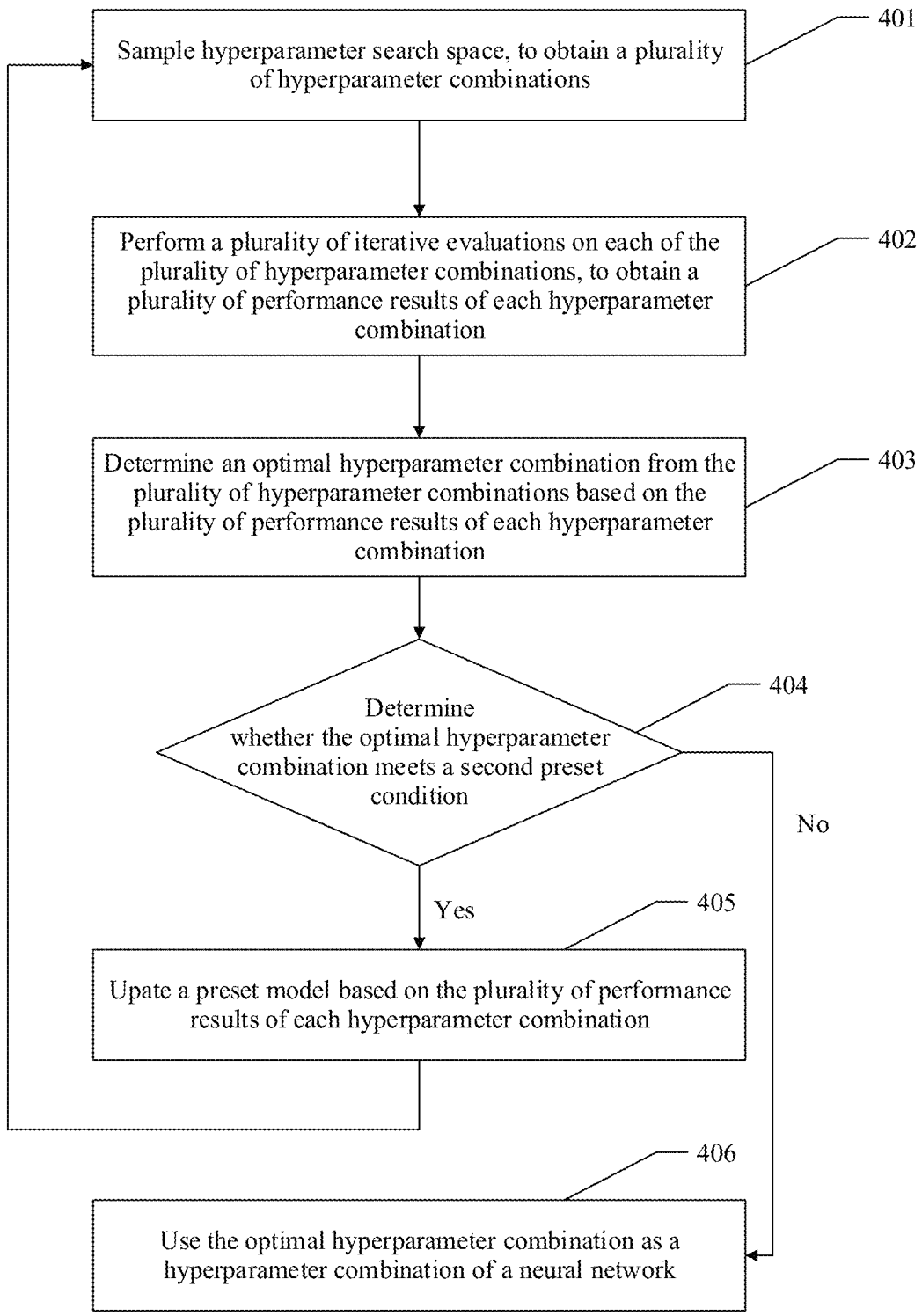
FIG. 4 is a schematic flowchart of a neural network optimization method according to an embodiment of this application.

FIG. 4 is a schematic flowchart of a neural network optimization method according to an embodiment of this application.

401: Sample hyperparameter search space, to obtain a plurality of hyperparameter combinations.

The hyperparameter search space includes a hyperparameter of a neural network, and hyperparameters may be sampled from the hyperparameter search space, to obtain the plurality of hyperparameter combinations. A group of hyperparameter combinations may include values of one or more hyperparameters.

Specifically, the hyperparameter search space may include a plurality of hyperparameters, and a value of each hyperparameter may be a continuously distributed value or a discretely distributed value. For example, in the hyperparameter search space, a value range of a hyperparameter A maybe [0, 10], and a value of a hyperparameter B may include 1, 5, 8, 9, or the like. Therefore, when the hyperparameter search space is sampled, a value may be randomly selected from continuously distributed values, or from discretely distributed values, to obtain a group of hyperparameter combinations.

Optionally, the hyperparameter search space may be sampled in a plurality of manners.

In a possible implementation, a hyperparameter combination may be collected based on initial probability distribution or collected randomly. For example, if the hyperparameter search space is sampled for the first time, the hyperparameter search space may be sampled based on the initial probability distribution, to obtain the plurality of hyperparameter combinations.

In another possible implementation, the hyperparameter search space may also be sampled based on probability distribution determined by an updated preset model in step 405. For example, if the preset model is updated, the hyperparameter search space may be sampled based on the probability distribution determined by the preset model, to obtain the plurality of hyperparameter combinations.

For example, before step 401, the preset model may be obtained. A specific collection function may include $a(x, \alpha) = \int_{-\infty}^{\infty} \max(0, \alpha - y) p(y|x) dy$, where x is a hyperparameter combination, $p(y|x)$ is the probability distribution corresponding to the preset model, y is a performance result of the hyperparameter combination, and $\alpha$ is a preset value. Therefore, the collection function may be used to sample the hyperparameter search space, to obtain the plurality of hyperparameter combinations that meet the probability distribution corresponding to the preset model.

For ease of understanding, the following describes a hyperparameter and a neural network in this application by using some specific scenarios as examples.

Figure 3:
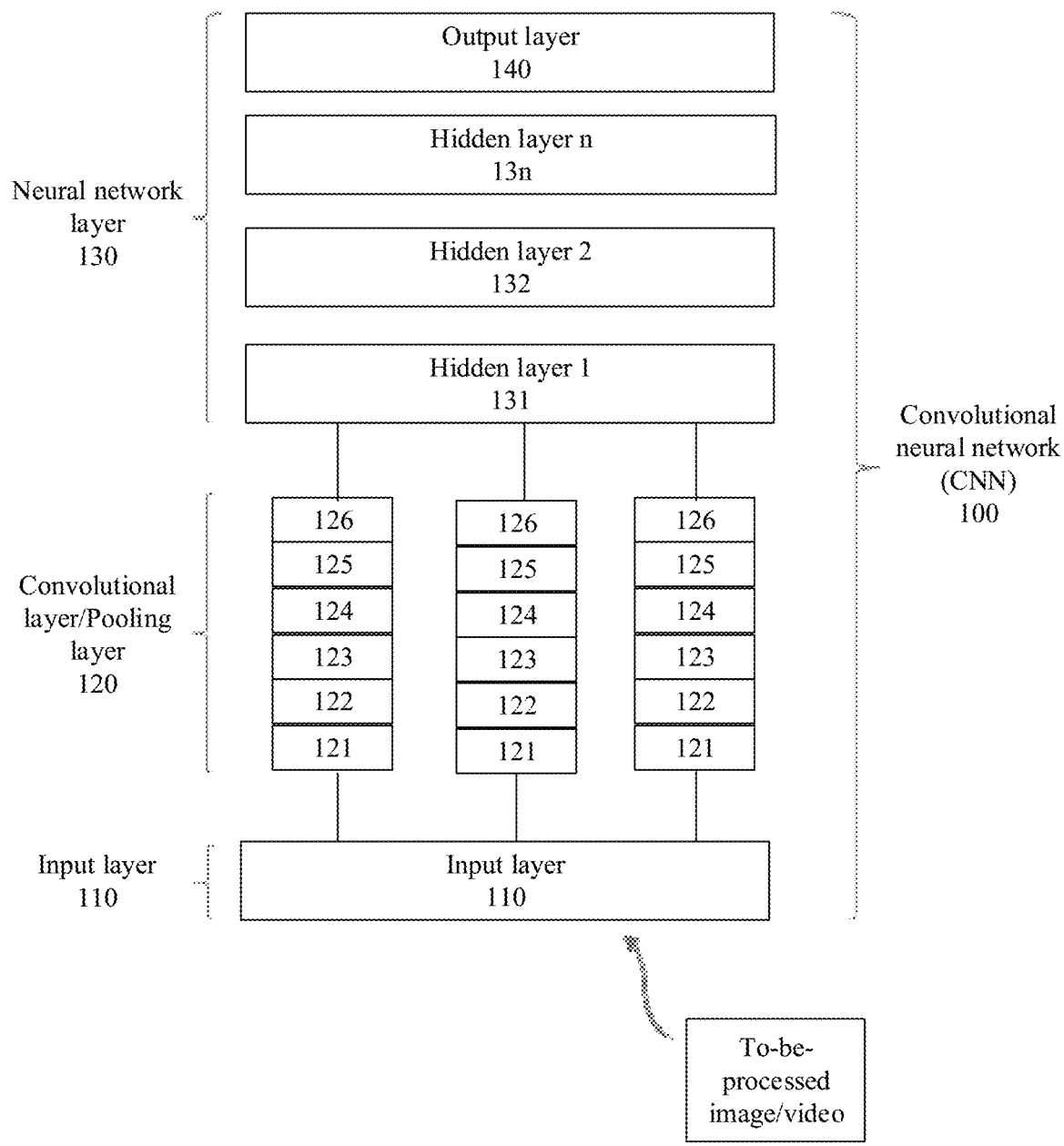
FIG. 3 is a schematic diagram of a structure of another convolutional neural network according to an embodiment of this application.

In a possible scenario, if the neural network is a convolutional neural network used for image recognition, for the convolutional neural network, refer to related descriptions in FIG. 2 and FIG. 3. Correspondingly, the hyperparameters of the convolutional neural network in the hyperparameter search space may include one or more of the following: a quantity of convolutional layers, a quantity of convolution kernels, an expansion size, a location of a ReLU function in the neural network, a size of an anchor box, or a ratio of a length to a width of an anchor box, and the anchor box is used to identify an object that needs to be recognized in an image. Correspondingly, the hyperparameter combinations mentioned in this application may include the one or more hyperparameters. For example, a self-driving scenario imposes a high requirement for a road object detection function. Object detection may be understood as searching for a location of an object in an image by using one or more anchor boxes. Usually, a plurality of types of anchor boxes may be predefined, including a quantity of anchor boxes used in an image, an aspect ratio of each anchor box, and the like.

In a possible scenario, if the neural network is obtained through structure searching, that is, the neural network is obtained through combining or stacking one or more construction units, the hyperparameters included in the hyperparameter search space may include: a quantity of network layers of one construction unit, a quantity of neurons at each network layer of a construction unit, an operation operator of each neuron in a construction unit, or the like. Correspondingly, the hyperparameter combinations mentioned in this application may include the one or more hyperparameters. For example, if a construction unit of a facial recognition neural network needs to be searched for, the hyperparameters included in the hyperparameter search space may include: a quantity of network layers of one construction unit of the facial recognition neural network, a quantity of neurons at each network layer of a construction unit, an operation operator of each neuron in a construction unit, and the like. The hyperparameter combination is used for constructing the facial recognition neural network.

In a possible data augmentation scenario, a transformation operation needs to be performed on data included in an existing data set, to increase an amount of data included in the data set, so as to obtain an enhanced data set. In this scenario, a transformation manner performed on the data to enhance the data needs to be determined. The hyperparameter search space may include a plurality of transformation manners, and the plurality of transformation manners are used to transform data, to increase a data amount. For example, in an image augmentation scenario, the transformation manners may include an operation such as rotation, translation, or folding, to increase a quantity of images.

In a possible reinforcement learning scenario, a learned policy needs to be determined. An adjustable variable included in the learned policy is a hyperparameter of the neural network. Therefore, the neural network can perform learning based on the learned policy, to adjust some parameters of the neural network. For example, if inputs of a neuron in the neural network are x1 and x2, a weight of x1 is w1, and an output of the neuron is w1×x1+w2×x2, the learned policy that needs to be determined is how to update w1 or w2, for example, determining to adjust a stride and an adjustment calculation manner.

402: Perform a plurality of iterative evaluations on the plurality of hyperparameter combinations, to obtain a plurality of performance results of each hyperparameter combination.

After the plurality of hyperparameter combinations are obtained, the plurality of iterative evaluations are performed on the plurality of hyperparameter combinations, to obtain the plurality of performance results of each hyperparameter combination.

In any iterative evaluation, at least one performance result of each hyperparameter combination is obtained. If a hyperparameter combination in the plurality of hyperparameter combinations meets a first preset condition, the hyperparameter combination that meets the first preset condition is re-evaluated, to obtain a re-evaluated performance result of the hyperparameter combination that meets the first preset condition. For example, the first preset condition is that a quantity of evaluations is the smallest or a performance result is better than a specific performance result. Therefore, in this implementation of this application, the hyperparameter combination that meets the first preset condition is re-evaluated, instead of focusing only on a hyperparameter combination with optimal performance. This can improve accuracy of an overall performance result of the plurality of hyperparameter combinations, and enable the model to converge quickly in subsequent updating.

Specifically, any one of the plurality of iterative evaluations may include: obtaining at least one performance result of each of the plurality of hyperparameter combinations, and determining a second hyperparameter combination from the plurality of hyperparameter combinations based on the at least one performance result of each hyperparameter combination, where the second hyperparameter combination is a hyperparameter combination with a largest quantity of evaluations or with optimal performance. Then, the first preset condition may be determined based on at least one performance result of the second hyperparameter combination. Then, it is determined whether a hyperparameter combination that meets the first preset condition exists in the at least one hyperparameter combination. If a first hyperparameter combination in the plurality of hyperparameter combinations meets the first preset condition, the first hyperparameter combination is re-evaluated, to obtain a re-evaluated performance result of the first hyperparameter combination, where the second hyperparameter combination is different from the first hyperparameter combination. If the first hyperparameter combination in the plurality of hyperparameter combinations does not meet the first preset condition, the second hyperparameter combination is re-evaluated, to obtain a re-evaluated performance result of the second hyperparameter combination.

There are a plurality of manners of obtaining the at least one performance result of each hyperparameter combination. The plurality of hyperparameter combinations may be evaluated, to obtain the at least one performance result of each hyperparameter combination. Alternatively, the at least one performance result obtained through evaluating each hyperparameter combination before this iterative evaluation is obtained. In the first evaluation, each of the plurality of hyperparameter combinations is evaluated, to obtain the at least one performance result of each hyperparameter combination. In any $N^{th}$ iterative evaluation other than the first evaluation, at least one performance result of each hyperparameter combination that is obtained in previous N−1 iterative evaluations is obtained, and then iterative evaluation continues to be performed based on the at least one performance result of each hyperparameter combination, to obtain a plurality of performance results of each hyperparameter combination, where N is a positive integer greater than 1.

That the first preset condition is associated with the at least one performance result of the second hyperparameter combination may be understood as that the first preset condition is determined based on the at least one performance result of the second hyperparameter combination. Specifically, that the first preset condition is determined based on at least one performance result of the second hyperparameter combination may include one of the following: a quantity of times of evaluating the first hyperparameter combination is not greater than a preset quantity of times, and the quantity of times of evaluating the first hyperparameter combination is not greater than a quantity of times of evaluating the second hyperparameter combination; or a quantity of times of evaluating the first hyperparameter combination is greater than a preset quantity of times, but not greater than a quantity of times of evaluating the second hyperparameter combination, and a portion of the at least one performance result of the second hyperparameter combination is worse than the performance result of the first hyperparameter combination. It may be understood that when a quantity of times of evaluating a hyperparameter combination is small, an obtained performance result may be inaccurate. Therefore, the hyperparameter combination may be re-evaluated, to obtain a re-evaluated performance result. Alternatively, when a quantity of times of evaluating a hyperparameter combination is greater than a preset quantity of times, but an evaluation result of the hyperparameter combination is better than some performance results of the second hyperparameter combination, the hyperparameter combination may be re-evaluated. Whether a performance result of the hyperparameter combination can be better is further determined based on a re-evaluated performance result. Therefore, in this implementation of this application, a hyperparameter combination with a small quantity of evaluations or with some good performance results may be re-evaluated. If a performance result of a hyperparameter combination is poor, the hyperparameter combination may also be re-evaluated, so that the performance result of the hyperparameter combination is more accurate.

For example, the first preset condition may specifically be as follows:

1. $n_k < n_{k'}$ and $n_k < c_n$, where $n_k$ is the quantity of times of evaluating the first hyperparameter combination, $n_{k'}$ is the quantity of times of evaluating the second hyperparameter combination, and $c_n$ is the preset quantity of times; or
2. $c_n < n_k < n_{k'}$, $\overline{Y}_{1:n_k}^{(k')} \geq \overline{Y}_{j:(j+n_k-1)}^{(k')}$, $1 \leq j \leq n_{k'} - n_k + 1$, and $\overline{Y}_{l:u}^{(k)} = (\sum_{v=l}^{u} Y_v^{(k)})/u - l + 1)$, where $Y^{(k)}$ is a performance result of a $k^{th}$ hyperparameter combination, and $Y^{(k')}$ is the performance result of the second hyperparameter combination. If one of the conditions is met, it may be determined that the first hyperparameter combination meets the first preset condition. u is a positive integer less than $n_k$, and l is a positive integer not greater than u.

For example, if the first hyperparameter combination has 10 performance results, and the second hyperparameter combination has 50 performance results, the 50 performance results of the second hyperparameter combination may be traversed, to determine whether there are 10 performance results in the 50 performance results that are worse than 10 performance results of the first hyperparameter combination. If the evaluation result includes a loss value, an average value of 10 loss values of the second hyperparameter combination may be compared with an average value of 10 loss values of the first hyperparameter combination, to determine whether an average value of 10 loss values in 50 loss values of the second hyperparameter combination is greater than the average value of 10 loss values of the first hyperparameter combination. If the average value of 10 loss values in 50 loss values of the second hyperparameter combination is greater than the average value of 10 loss values of the first hyperparameter combination, it is determined that the first hyperparameter combination meets the first preset condition; or if the average value of 10 loss values in 50 loss values of the second hyperparameter combination is not greater than the average value of 10 loss values of the first hyperparameter combination, it is determined that the first hyperparameter combination does not meet the first preset condition.

Usually, if there are a plurality of hyperparameter combinations whose quantity of evaluations is less than a threshold and not greater than the quantity of times of evaluating the second hyperparameter combination, that is, there are a plurality of hyperparameter combinations that meet the condition 1, a hyperparameter combination with a smallest quantity of evaluations is used as the first hyperparameter combination. Alternatively, each hyperparameter combination whose quantity of evaluations is less than a threshold and not greater than the quantity of times of evaluating the second hyperparameter combination is used as the first hyperparameter combination, that is, the plurality of hyperparameter combinations whose quantity of evaluations is less than the threshold and not greater than the quantity of times of evaluating the second hyperparameter combination may be re-evaluated. If a plurality of hyperparameter combinations meet the condition 2, a hyperparameter combination with better performance is selected from the plurality of hyperparameter combinations as the first hyperparameter combination, or each hyperparameter combination in the plurality of hyperparameter combinations that meet the condition 2 is used as the first hyperparameter combination. In addition, the plurality of hyperparameter combinations that meet the condition 2 may be re-evaluated.

Therefore, a hyperparameter combination that needs to be re-evaluated may be selected from the plurality of hyperparameter combinations based on the first preset condition, to re-evaluate a hyperparameter combination with a small quantity of evaluations or a hyperparameter combination whose performance result is better than some performance results of the second hyperparameter combination. This can improve accuracy of a performance result of the hyperparameter combination, and further improve accuracy of an overall performance result of a plurality of hyperparameter combinations.

It may be understood that, after the optimal second hyperparameter combination is determined, a condition for selecting a hyperparameter combination that needs to be re-evaluated is relaxed, to re-evaluate more hyperparameter combinations without optimal performance or with a small quantity of evaluations. This can make an overall performance result of a plurality of finally obtained hyperparameter combinations more accurate, and further improve a convergence speed of the model after subsequent updating.

In addition, a specific manner of evaluating the hyperparameter combination to obtain a performance result of the hyperparameter combination may include: substituting a hyperparameter included in the hyperparameter combination into the neural network, and then determining the performance result of the hyperparameter combination based on an output of the neural network. The performance result may be classification precision, a loss value, precision (precision), a recall (recall) rate, an epoch (epoch), or the like of a result output by the neural network. The classification precision indicates accuracy of recognizing an image by the neural network. The loss value is a value of a loss function of the neural network. The precision indicates a ratio of a sample that is determined to be true to a sum of a sample that is actually true and a sample that is actually false in the result output by the neural network, that is, indicates a quantity of true samples that are correctly predicted. The recall rate indicates a proportion of a sample that is determined to be true to a sample that is actually true in the result output by the neural network, that is, indicates a quantity of true samples in predicted samples that are correctly predicted.

One epoch indicates that all samples in a training set are trained once in a reinforcement learning scenario.

403: Determine an optimal hyperparameter combination from the plurality of hyperparameter combinations based on the plurality of performance results of each hyperparameter combination.

After the plurality of performance results of each hyperparameter combination are obtained, the optimal hyperparameter combination is determined from the plurality of hyperparameter combinations based on the plurality of performance results of each hyperparameter combination.

Specifically, a hyperparameter combination with a largest quantity of evaluations in the plurality of hyperparameter combinations may be used as an optimal hyperparameter combination. When there are a plurality of hyperparameter combinations with a largest quantity of evaluations, a hyperparameter combination with an optimal performance result may be determined from the plurality of hyperparameter combinations with a largest quantity of evaluations as the second hyperparameter combination.

There may be a plurality of manners of measuring whether a performance result is optimal, and may specifically include determining a parameter included in the performance result. In different scenarios, parameters included in performance results of a hyperparameter combination are different, and manners of measuring whether the performance result is optimal may be different. For example, a hyperparameter combination with an optimal performance result may be a hyperparameter combination with highest classification precision, a highest average value of classification precision, a lowest loss value, or the like.

404: Determine whether the optimal hyperparameter combination meets a second preset condition; and if the optimal hyperparameter combination meets the second preset condition, perform step 405; or if the optimal hyperparameter combination does not meet the second preset condition, perform step 406.

After the optimal hyperparameter combination is determined, whether the optimal hyperparameter meets the second preset condition is determined. If the optimal hyperparameter combination meets the second preset condition, a hyperparameter included in the optimal hyperparameter combination is used as a hyperparameter of the neural network, that is, step 406 is performed. If the optimal hyperparameter combination does not meet the second preset condition, the preset model is updated based on the plurality of performance results of each hyperparameter combination, that is, step 405 is performed.

Specifically, the second preset condition may vary with different performance results of the hyperparameter combination, and the second preset condition may correspond to different conditions in different scenarios. For example, the following uses some specific scenarios as examples for description. When the performance results of the hyperparameter combination include the classification precision, the second preset condition may include: the classification precision in any one of the plurality of performance results is greater than a first threshold, or an average value of the classification precision included in the plurality of performance results of the optimal hyperparameter combination is greater than a second threshold. When the performance results of the hyperparameter combination include the loss value of the neural network, the second preset condition may include: the loss value is not greater than a third threshold. When the performance results of the hyperparameter combination include the precision or the recall rate, the second preset condition may include: any precision is greater than a fourth threshold, an average value of a plurality of precision is greater than a fifth threshold, the recall rate is greater than a sixth threshold, or the like. When the performance results of the hyperparameter combination include a quantity of epochs, the second preset condition may include: the quantity of epochs is not greater than a seventh threshold.

405: Update the preset model based on the plurality of performance results of each hyperparameter combination.

If the determined optimal hyperparameter combination does not meet the second preset condition, the preset model is updated based on the plurality of performance results of each of the plurality of hyperparameter combinations. The model is used to fit probability distribution, and the probability distribution is used to sample the hyperparameter. Therefore, after the preset model is updated, step 401 may continue to be performed.

Specifically, a first preset model includes a first probability density function and a second probability density function. For ease of understanding, the first probability density function is represented as $l(x)$, and the second probability density function is represented as $g(x)$. Usually, the probability density function is a continuous function, and indicates a possibility that an output value of a random variable is near a determined value point. A probability that a value of the random variable falls within an area is an integral of the probability density function in the area. When the probability density function exists, a cumulative distribution function is an integral of the probability density function.

Optionally, a type of the first probability density function and the second probability density function may include but are not limited to one or more of the following: normal distribution, discrete distribution, truncated normal distribution, log-normal distribution, exponential distribution, gamma distribution (gamma distribution), beta distribution (beta distribution), Bernoulli distribution, or the like. A specific type of the probability density function may be adjusted based on an actual application scenario. This is not limited in this application.

After the plurality of performance results of each of the plurality of hyperparameter combinations are obtained, the plurality of hyperparameter combinations are classified into two types: a first-type hyperparameter combination and a second-type hyperparameter combination. Performance of the first-type hyperparameter combination is better than performance of the second-type hyperparameter combination, the performance of the first-type hyperparameter combination is determined based on a plurality of performance results of the first-type hyperparameter combination, and the performance of the second-type hyperparameter combination is determined based on a plurality of performance results of the second-type hyperparameter combination. $l(x)$ is updated based on the first-type hyper-parameter combination, and $g(x)$ is updated based on the second-type hyperparameter combination.

It may be understood that overall performance of the first-type hyperparameter combination is better than overall performance of the second-type hyperparameter combination. For example, a quantity of evaluations of the first-type hyperparameter combination is greater than that of the second-type hyperparameter combination, an average value of classification precision included in the plurality of performance results of the first-type hyperparameter combination is greater than an average value of classification precision included in the plurality of performance results of the second-type hyperparameter combination, or an average value of loss values included in the plurality of performance results of the first-type hyperparameter combination is less than an average value of loss values included in the plurality of performance results of the second-type hyperparameter combination. In different scenarios, manners of evaluating that the first-type hyperparameter combination is better than the second-type hyperparameter combination may be different, and may specifically be adjusted based on an actual application scenario. This embodiment of this application is described as an example.

A manner of updating the probability density function based on the performance results may be updating the probability density function by using kernel density estimation (kernel density estimation, KDE), a tree parzen estimator (tree parzen estimator, TPE), a Gaussian process (Gaussian process, GP), sequential model-based algorithm configuration (sequential model-based algorithm configuration, SMAC), or the like. For example, the KDE is used as an example. A model is first set, for example, a linear model, a linearizable model, or an exponential model. Then, a distribution range of hyperparameter combinations with better performance results is recorded based on the plurality of performance results of each input hyperparameter combination, and fitting is performed based on the set model and the distribution range, to obtain an updated model. More specifically, in this application, the plurality of hyperparameter combinations are classified into the first-type hyperparameter combination and the second-type hyperparameter combination based on the performance results. A distribution range of hyperparameter combinations with better performance may be determined based on the performance results of the first-type hyperparameter, to obtain the first probability density function through fitting. A distribution range of hyperparameter combinations with worse performance is determined based on the performance results of the second type of hyperparameters, to obtain the second probability density function through fitting.

In addition, there are a plurality of manners of classifying the plurality of hyperparameter combinations. The following describes several feasible classification manners as examples. Specifically, the classification manners may be adjusted based on an actual application scenario. This is not limited in this application.

Manner 1: Perform Classification after Comparison with a Preset Value

An average value of the performance results of each hyperparameter combination is determined. If the average value is better than a preset value, a corresponding hyperparameter combination is classified into the first-type hyperparameter combination. If the average value is not better than the preset value, a corresponding hyperparameter combination is classified into the second-type hyperparameter combination. The average value may alternatively be replaced with an optimal value, a most distributed value, or the like in the plurality of performance results. Specifically, the average value may be adjusted based on an actual application scenario. In this application, only the average value is used as an example for description.

There are different determining manners in different scenarios for determining whether the average value is better than the preset value. For example, if the performance results include the classification precision, higher classification precision usually indicates better performance of a hyperparameter combination. Therefore, a hyperparameter combination whose average classification precision is greater than the preset value is classified into the first-type hyperparameter combination, and a hyperparameter combination whose average classification precision is not greater than the preset value is classified into the second-type hyperparameter combination. For another example, if the performance results of the hyperparameter combination include the loss value, a lower loss value usually indicates better performance of a hyperparameter combination. Therefore, a hyperparameter combination whose average loss value is less than the preset value is classified into the first-type hyperparameter combination, and a hyperparameter combination whose average classification precision is not less than the preset value is classified into the second-type hyperparameter combination.

Manner 2: Allocation in Proportion

The plurality of hyperparameter combinations may be classified into two types based on a preset proportion. For example, a ratio of 3:7 may be preset. Based on the performance results of each hyperparameter combination, $3/10$ of the hyperparameter combinations with better performance are classified into the first-type hyperparameter combination, and $7/10$ of the hyperparameter combinations with poorer performance are classified into the second-type hyperparameter combination. A manner of comparing the performance results of the hyperparameter combination may include: calculating an average value of the plurality of performance results of each hyperparameter combination; sorting average values of the plurality of hyperparameter combinations; and then using a hyperparameter combination with better performance as the second hyperparameter combination based on the preset proportion and a sorting result, and using a hyperparameter combination with worse performance as the first hyperparameter combination.

In addition, other than sorting based on the average value of the plurality of performance results of each hyperparameter combination, sorting may alternatively be performed based on an optimal performance result in the plurality of performance results of each hyperparameter combination, or performed based on a most distributed value in the plurality of performance results of each hyperparameter combination. Specifically, a sorting manner may be adjusted based on an actual scenario.

In addition, Manner 2 is similar to Manner 1. When the performance results of the hyperparameter combination include the loss value, a lower loss value indicates a better performance result of the hyperparameter combination, and a higher loss value indicates a poor performance result of the hyperparameter combination. Alternatively, when the performance results of the hyperparameter combination include the classification precision, higher classification precision indicates better performance of the hyperparameter combination, and lower classification precision indicates poor performance of the hyperparameter combination.

After the preset model is updated based on the plurality of performance results of each hyperparameter combination, sampling may be performed based on the probability distribution obtained by the preset model through fitting. For example, a specific collection function may include $a(x, \alpha) = \int_{-\infty}^{\infty} \max(0, \alpha-y) p(y|x) dy$, where x is a hyperparameter combination, $$p(y|x) = \begin{cases} l(x) & \text{if } < \alpha \\ g(x) & \text{if } y \geq \alpha \end{cases},$$

after l(x) and g(x) are updated, a hyperparameter combination is re-collected based on probability distribution corresponding to l(x), and a plurality of hyperparameter combinations finally collected are determined based on l(x)/g(x), that is, the collected hyperparameter combination meets probability distribution corresponding to l(x) and g(x). It may be understood that, in this implementation of this application, l(x)/g(x) needs to be maximized, to increase a probability of collecting a hyperparameter combination with better performance, so that the collected hyperparameter combination tends to be a hyperparameter combination with optimal performance. This can accurately and efficiently determine a hyperparameter combination with better performance.

406: Use the optimal hyperparameter combination as a hyperparameter combination of the neural network.

After the optimal hyperparameter combination is determined, and meets the second preset condition, the optimal hyperparameter combination may be used as the hyperparameter combination of the neural network.

For example, if the hyperparameter search space includes a hyperparameter of a convolutional neural network, after the optimal hyperparameter combination is determined, the hyperparameter included in the optimal hyperparameter combination is used as the hyperparameter of the convolutional neural network. If the optimal hyperparameter combination includes parameters such as a quantity of convolutional layers, a kernel size, an expansion size, and a location of a ReLU function, the parameters included in the optimal hyperparameter combination are used as a quantity of convolutional layers, a kernel size, an expansion size, and a location of a ReLU function of the convolutional neural network.

Therefore, in this implementation of this application, when the plurality of hyperparameter combinations are evaluated, in addition to evaluating a hyperparameter combination with optimal performance in the plurality of hyperparameter combinations, a hyperparameter combination without optimal performance or with a small quantity of evaluations may further be re-evaluated. This can avoid an inaccurate performance result caused by a small quantity of evaluations or an error in some performance results, and improve accuracy of performance results of a finally obtained hyperparameter combination. Further, the model may be updated based on the accurate performance results, so that the model can converge quickly. This can improve convergence efficiency. In addition, the hyperparameter search space is further sampled by using the model. This can accurately and efficiently determine a hyperparameter combination with better performance.

The foregoing describes a procedure of the neural network optimization method provided in this application. The following describes the neural network optimization method provided in this application by using a specific application scenario as an example.

Figure 5A:
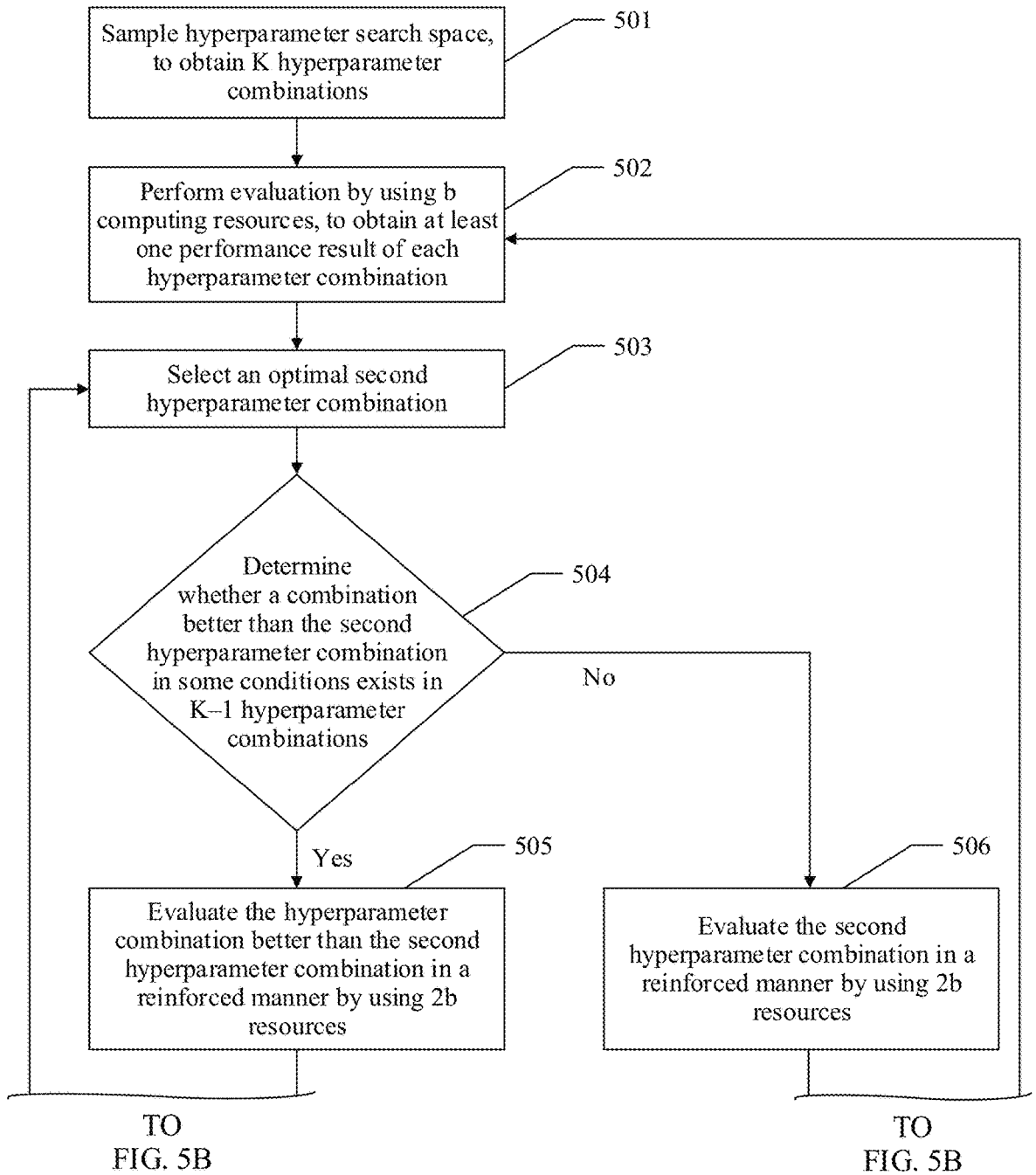
FIG. 5A and FIG. 5B are a schematic flowchart of another neural network optimization method according to an embodiment of this application.
Figure 5B:
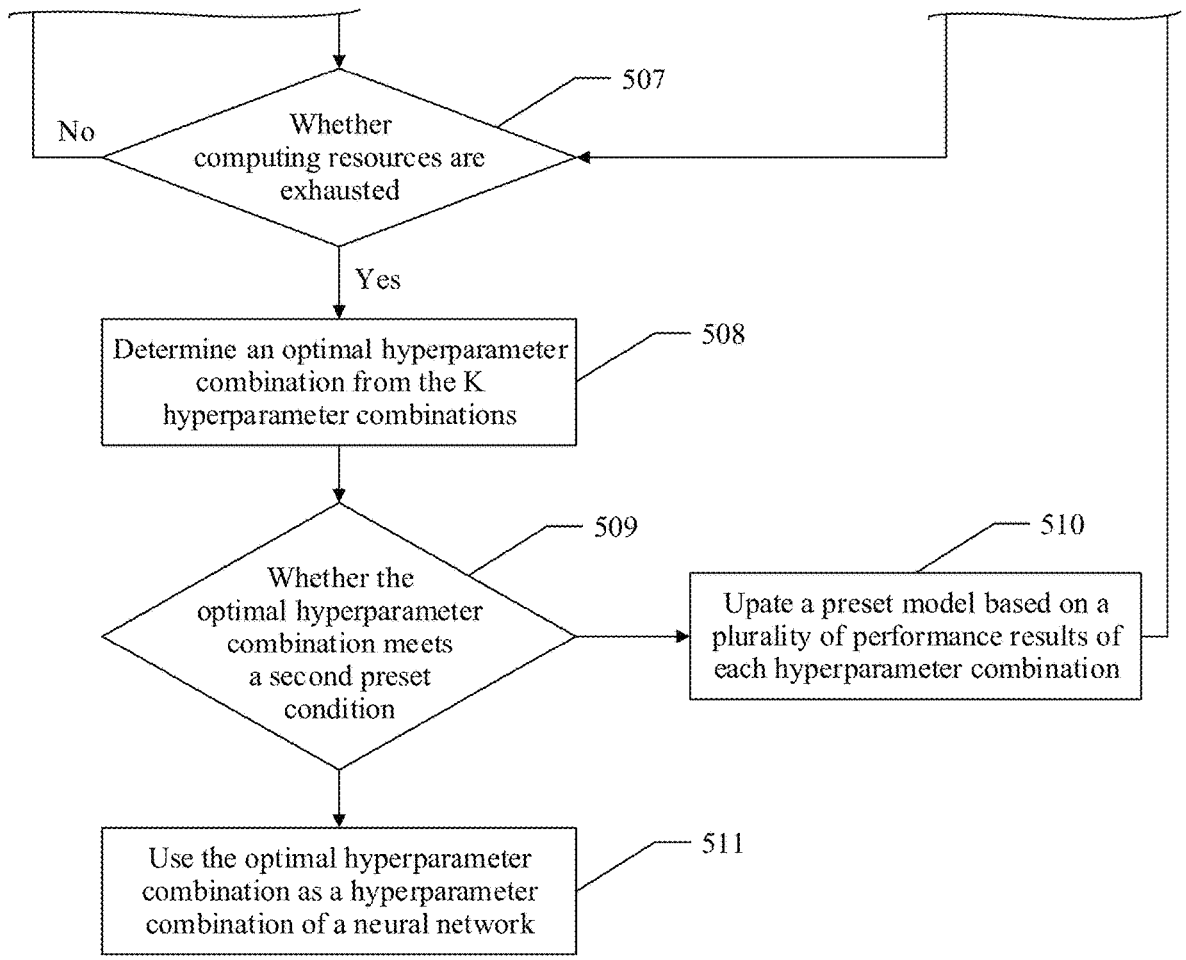

FIG. 5A and FIG. 5B are a schematic flowchart of another neural network optimization method according to an embodiment of this application.

501: Sample hyperparameter search space, to obtain K hyperparameter combinations.

The hyperparameter search space may be randomly sampled, or sampled based on probability distribution determined by a preset model, to obtain the K hyperparameter combinations, where K is a positive integer, and a specific value of K may be adjusted based on an actual application scenario.

For example, a convolutional neural network is used as an example. The hyperparameter search space may include value ranges of a plurality of hyperparameter combinations such as a quantity of convolutional layers, a quantity of convolution kernels, an expansion size, a location of a ReLU function in the neural network, a size of an anchor box, or a ratio of a length to a width of an anchor box. If the hyperparameter search space is sampled for the first time, a batch of hyperparameter combinations may be randomly collected from the hyperparameter search space, to obtain the K hyperparameter combinations. Each hyperparameter combination includes a quantity of convolutional layers, a quantity of convolution kernels, an expansion size, a location of a ReLU function in the neural network, a size of an anchor box, or a ratio of a length to a width of an anchor box.

For step 501, refer to related descriptions of step 401. Details are not described herein again.

502: Perform evaluation by using b computing resources, to obtain at least one performance result of each hyperparameter combination.

The b resources may include different resources in different scenarios. For example, the b computing resources may include b iterations, that is, a quantity of iterations is b. Alternatively, in a Monte Carlo method, the b computing resources may include a quantity of used samples, for example, a quantity of samples is b. Alternatively, in a reinforcement learning scenario, the b computing resources may include a quantity of rounds to attempt learning.

For example, b iterative evaluations may be performed on each hyperparameter combination, to obtain b performance results of each hyperparameter combination.

Figure 6:
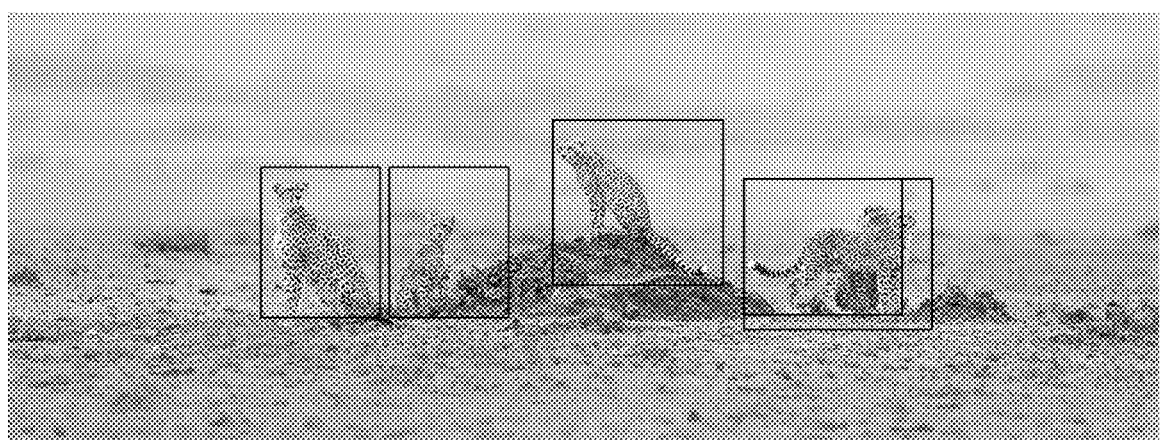
FIG. 6 is a schematic diagram of an application scenario according to an embodiment of this application.
Figure 7:
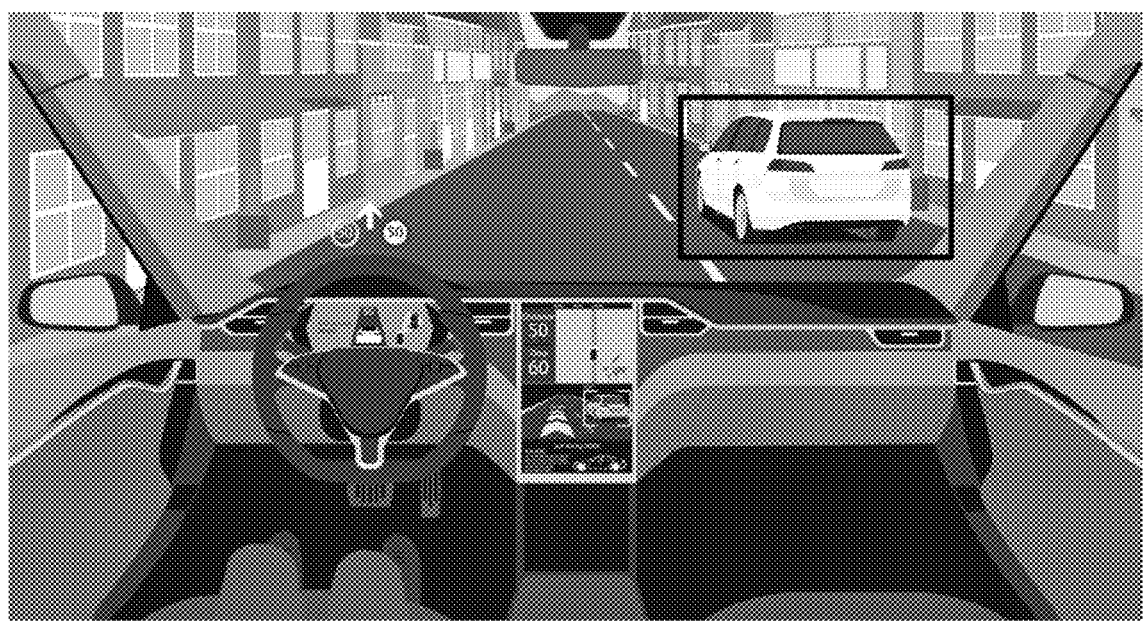
FIG. 7 is a schematic diagram of another application scenario according to an embodiment of this application.

A convolutional neural network used for image recognition is used as an example. Values such as a quantity of convolutional layers, a quantity of convolution kernels, an expansion size, a location of a ReLU function in the convolutional neural network, a size of an anchor box, or a ratio of a length to a width of an anchor box that are included in each hyperparameter combination may be substituted into the convolutional neural network. Then, existing training data is used as an input of the convolutional neural network, to obtain an output of the convolutional neural network. The output of the convolutional neural network is compared with an actual value of the training data, to obtain one performance result of the hyperparameter combination. If b iterative evaluations are performed, b performance results are obtained. As shown in FIG. 6, an image shown in FIG. 6 is used as an input of the convolutional neural network, and values such as a quantity of convolutional layers, a quantity of convolution kernels, an expansion size, a location of a ReLU function in the convolutional neural network, a size of an anchor box, or a ratio of a length to a width of an anchor box that are included in each hyperparameter combination are substituted into the convolutional neural network. A to-be-recognized or recognized animal in the image is annotated based on the size of the anchor box (the black box shown in FIG. 6), or the ratio of the length to the width of the anchor box. For another example, a self-driving scenario is shown in FIG. 7. An image collected by a vehicle sensor or a camera may be used as an input of the convolutional neural network, and the vehicle or another obstacle in the image is annotated based on a size of an anchor box (the black box shown in FIG. 7), or a ratio of a length to a width of an anchor box included in the hyperparameter combination. This can provide decision input information for a self-driving control system of a vehicle, and improve driving safety of the vehicle.

503: Select an optimal second hyperparameter combination.

After the plurality of performance results of each of the K hyperparameter combinations are obtained, the optimal second hyperparameter combination is selected based on the plurality of performance results of each hyperparameter combination.

In different scenarios, parameters included in performance results of a hyperparameter combination are different, and manners of measuring whether the performance result is optimal may be different. For example, a hyperparameter combination with an optimal performance result may be a hyperparameter combination with highest classification precision, a highest average value of classification precision, a lowest loss value, or the like.

504: Determine whether a combination better than the second hyperparameter combination in some conditions exists in K−1 hyperparameter combinations; and if the combination better than the second hyperparameter combination in some conditions exists in the K−1 hyperparameter combinations, perform step 505; or if the combination better than the second hyperparameter combination in some conditions does not exist in K−1 hyperparameter combinations, perform step 506.

After the optimal second hyperparameter combination is determined, it is determined whether the combination better than the second hyperparameter combination in some conditions exists in the K−1 hyperparameter combinations in the K hyperparameter combinations other than the second hyperparameter combination. If the combination better than the second hyperparameter combination in some conditions exists, the combination better than the second hyperparameter combination in some conditions may be re-evaluated. If the combination better than the second hyperparameter combination in some conditions does not exist, the second hyperparameter combination may be re-evaluated. It may be understood that the hyperparameter combination better than the second hyperparameter combination in some conditions mentioned in this step is the first hyperparameter combination that meets the first preset condition.

The determining whether a combination better than the second hyperparameter combination in some conditions exists in K−1 hyperparameter combinations may specifically include:

1. $n_k < n_{k'}$ and $n_k < c_n$, where $n_k$ is a quantity of times of evaluating the first hyperparameter combination, $n_{k'}$ is a quantity of times of evaluating the second hyperparameter combination, and $c_n$ is a preset quantity of times; or
2. $c_n < n_k < n_{k'}$, $\overline{Y}_{1:n_k}^{(k)} \geq \overline{Y}_{j:(j+n_k-1)}^{(k')}$, $1 \leq j \leq n_{k'} - n_k + 1$, and $\overline{Y}_{l:u}^{(k)} = (\sum_{v=l}^{u} Y_v^{(k)})/(u-l+1)$. For details, refer to related descriptions of step 402. Details are not described herein again.

If the first hyperparameter combination meets one of the conditions, that is, the quantity of times of evaluating the first hyperparameter combination is too small, or the performance result is better than some performance results of the second hyperparameter combination, it may be understood that the first hyperparameter combination is better than the second hyperparameter combination in some conditions, and the first hyperparameter combination may be re-evaluated.

Therefore, in this implementation of this application, a criterion for selecting a hyperparameter combination that needs to be re-evaluated is lowered, to re-evaluate more hyperparameter combinations without optimal performance or with a small quantity of evaluations. This can make an overall performance result of a plurality of finally obtained hyperparameter combinations more accurate.

505: Evaluate the hyperparameter combination better than the second hyperparameter combination in a reinforced manner by using 2b resources.

If it is determined that the combination better than the second hyperparameter combination exists, it indicates that a combination whose quantity of evaluations is not greater than the preset value or whose performance results are better than some performance results of the second hyperparameter combination exists in the K hyperparameter combinations, the first hyperparameter combination whose performance results are better than some performance results of the second hyperparameter combination may be evaluated in a reinforced manner by using the 2b resources, to obtain the plurality of performance results of the first hyperparameter combination.

Therefore, in this implementation of this application, when the combination better than the second hyperparameter combination exists, the combination whose performance results are better than the performance results of the second hyperparameter combination may be re-evaluated.

506: Evaluate the second hyperparameter combination in a reinforced manner by using 2b resources.

If it is determined that the combination whose performance results are better than some performance results of the second hyperparameter combination does not exist, it indicates that a quantity of evaluations of each of the K hyperparameter combinations is greater than the preset value, or the performance results of each of the K hyperparameter combinations is not better than the performance results of the second hyperparameter combination, the second hyperparameter combination may be evaluated in a reinforced manner by using the 2b resources, to obtain the plurality of performance results of the second hyperparameter combination.

Therefore, in this implementation of this application, when it is determined that the combination better than the second hyperparameter combination does not exist, the second hyperparameter combination may be re-evaluated, to obtain a re-evaluated performance result. This can make performance results of the second hyperparameter combination more accurate.

In addition, the 2b resources in step 505 or step 506 may alternatively be replaced with b computing resources, more or fewer computing resources. Herein, only an example in which weighted evaluation is performed by using the 2b resources is used for description. Specifically, resources may be adjusted based on an actual application scenario. This is not limited in this application.

507: Determine whether the computing resources are exhausted; and if the computing resources are exhausted, perform step 508; or if the computing resources are not exhausted, perform step 503.

After re-evaluation is performed, it is determined whether the computing resources are exhausted. If the computing resources are not exhausted, step 503 may continue to be performed, that is, an optimal second hyperparameter combination is reselected.

The computing resources include the b resources and the 2b resources. The computing resources may be preset resources that can be used to evaluate a hyperparameter combination. For example, the computing resources may include a preset quantity of iterative evaluations. In step 507, it is determined whether a quantity of evaluations of the K hyperparameter combinations reaches the preset quantity of times. If the quantity of times of evaluating the K hyperparameter combinations reaches the preset quantity of times, a final performance result of the K hyperparameter combinations may be output. If the quantity of times of evaluating the K hyperparameter combinations does not reach the preset quantity of times, step 503 may continue to be performed. In other words, the hyperparameter combinations continue to be evaluated until the quantity of evaluations reaches the preset quantity of times.

Therefore, in this implementation of this application, the K hyperparameter combinations may be quickly evaluated by using step 501 to step 507. A Bayesian model is fitted based on the performance results of the K hyperparameter combinations, and sampling and evaluation are repeatedly performed based on the Bayesian model. The Bayesian model is corrected based on evaluation data obtained through cyclic iteration. Probability distribution that the optimal hyperparameter combination complies with may be fitted based on the Bayesian model, and a hyperparameter combination is collected based on the probability distribution finally obtained through fitting. In this application, in addition to re-evaluating the optimal hyperparameter combination in the plurality of hyperparameter combinations, some hyperparameter combinations without optimal performance or with a small quantity of evaluations in the plurality of hyperparameter combinations may further be evaluated, to improve accuracy of performance results of some hyperparameter combinations without optimal performance or with a small quantity of evaluations. This can improve accuracy of overall performance of the plurality of hyperparameter combinations, enable the Bayesian model to quickly converge, and accurately and efficiently determine an optimal hyperparameter combination.

508: Determine an optimal hyperparameter combination from the K hyperparameter combinations.

After it is determined that the computing resources are exhausted, final performance results of the K hyperparameter combinations may be obtained. The final performance results of the K hyperparameter combinations include the plurality of performance results of each hyperparameter combination obtained through evaluation in step 503 to step 507.

509: Determine whether the optimal hyperparameter combination meets a second preset condition.

510: Update the preset model based on the plurality of performance results of each hyperparameter combination.

511: Use the optimal hyperparameter combination as a hyperparameter combination of the neural network.

For step 508 to step 511, refer to related descriptions of step 403 to step 406. Details are not described herein again.

Therefore, this implementation of this application is not limited to focusing on the hyperparameter combination with optimal performance in the plurality of hyperparameter combinations, and a hyperparameter combination without optimal performance or with a small quantity of evaluations in the plurality of hyperparameter combinations is also re-evaluated. This can make performance results of a potential hyperparameter combination without optimal performance or with a small quantity of evaluations more accurate, and avoid a problem of inaccurate data caused by a small quantity of evaluations or an error in some evaluations. Accuracy of performance results of a potential hyperparameter combination is improved through increasing a quantity of evaluations. This can improve accuracy of an overall performance result of the plurality of hyperparameter combinations. Therefore, the preset model can be quickly converged, and an optimal hyperparameter combination can be accurately and efficiently determined based on the preset model.

For example, the following uses a common objects in context (common objects in context, COCO) dataset as input data of a neural network, to compare the neural network optimization method provided in this application with a common solution, and describes beneficial effects of the neural network optimization method provided in this application. The dataset includes detection labels of 80 common objects, about 11,000 training datasets, and 5,000 test datasets. Images included in the dataset are mainly captured from complex daily scenarios, and a location of an object in the image is annotated through accurate segmentation. The images in the dataset include 91 categories of targets, 328,000 images, and 2,500,000 labels.

Hyperparameters determined by using the neural network optimization method provided in this application and hyperparameters determined in some common manners are substituted into a neural network. FIG. 8 includes a comparison between output results. Some common manners include a manual manner, random search, Bayesian optimization and hyperband (Bayesian optimization and hyperband, BOHB), and the like. In the manual manner, a hyperparameter combination is manually obtained based on an empirical value. In random search, a hyperparameter combination is collected from hyperparameter search space based on even distribution. For BOHB, refer to the related descriptions. As shown in FIG. 8, the hyperparameter combination is determined by using the neural network optimization method provided in this application.

When x in $AP_x$ or $AR_x$ is a value, x indicates an overlap proportion between an anchor box and a target object. For example, $AP_{50}$ indicates that an overlap proportion between an anchor box and a to-be-detected target object in an image is 50%. S, M, and L indicate sizes of the to-be-detected object in the image, and the sizes are classified into small (small, S), medium (medium, M), and large (large, L). A specific classification standard may be adjusted based on an actual application scenario.

It may be understood that in BOHB, only an optimal combination is pursued, and whether the solution is helpful in estimation of the Bayesian model is not concerned. However, in the neural network optimization method provided in this application, in addition to focusing on a hyperparameter combination with optimal performance in a plurality of hyperparameter combinations, a hyperparameter combination without optimal performance or with a small quantity of evaluations in the plurality of hyperparameter combinations is also re-evaluated. Therefore, in an iteration process of the K hyperparameter combinations, the overall performance of the obtained K hyperparameter combinations tends to be optimal, that is, when a quantity of evaluations tends to infinity, the overall performance tends to be optimal. In this embodiment of this application, an overall Bayesian process is ensured. Therefore, the Bayesian model can be better estimated, so that a hyperparameter combination extracted each time is closer to an optimal combination.

Therefore, it can be learned from FIG. 8 that, in the neural network optimization method provided in this application, when the determined hyperparameter combination is applied to the convolutional neural network, an AP and an AR that are output when the convolutional neural network recognizes an image are higher than an AP and an AR output in some common manners. Therefore, the neural network optimization method provided in this application can determine a hyperparameter combination with an optimal performance result.

The foregoing describes in detail a procedure of the neural network optimization method provided in this application. The following describes, based on the neural network optimization method, a neural network optimization apparatus provided in this application. The neural network optimization apparatus is configured to perform steps of the method corresponding to FIG. 4 to FIG. 8.

Figure 9:
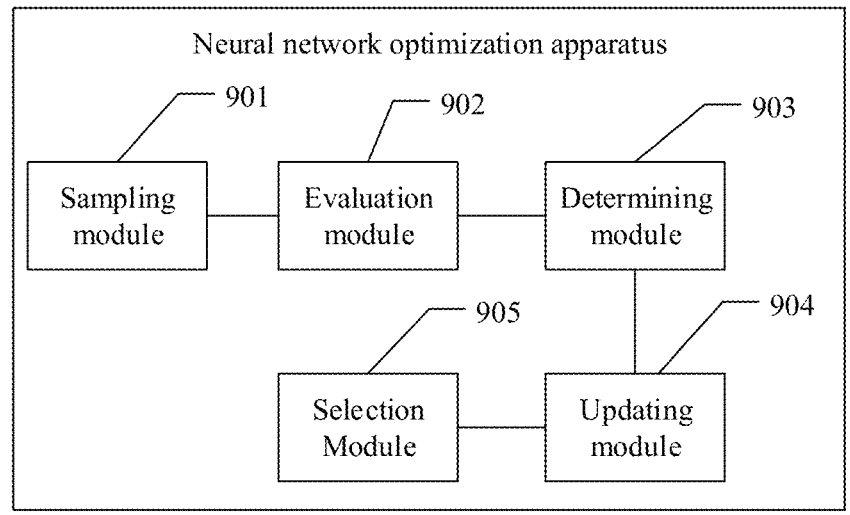
FIG. 9 is a schematic diagram of a structure of a neural network optimization apparatus according to an embodiment of this application.

FIG. 9 is a schematic diagram of a structure of a neural network optimization apparatus according to this application. The neural network optimization apparatus includes:

a sampling module 901, configured to sample hyperparameter search space, to obtain a plurality of hyperparameter combinations, where the hyperparameter search space includes a hyperparameter of a neural network, and the hyperparameter indicates a parameter, of the neural network, obtained without training;

an evaluation module 902, configured to: perform a plurality of iterative evaluations on the plurality of hyperparameter combinations, to obtain a plurality of performance results of each of the plurality of hyperparameter combinations, where the plurality of performance results are determined based on a result output by the neural network after each hyperparameter combination is substituted into the neural network; in any one of the plurality of iterative evaluations, obtain at least one performance result of each hyperparameter combination that is obtained through evaluation before a current evaluation; and if a first hyperparameter combination in the plurality of hyperparameter combinations meets a first preset condition, re-evaluate the first hyperparameter combination, to obtain a re-evaluated performance result of the first hyperparameter combination, where the re-evaluated performance result is included in a plurality of performance results of the first hyperparameter combination;

a determining module 903, configured to determine an optimal hyperparameter combination from the plurality of hyperparameter combinations based on the plurality of performance results of each hyperparameter combination;

an updating module 904, configured to: if the optimal hyperparameter combination does not meet a second preset condition, update a preset model based on the plurality of performance results of each hyperparameter combination, where the preset model is used to fit probability distribution, and the probability distribution is used to resample the hyperparameter search space; and a selection module 905, configured to: if the optimal hyperparameter combination meets a second preset condition, use the optimal hyperparameter combination as a hyperparameter combination of the neural network.

In a possible implementation, the first preset condition includes: a quantity of times of evaluating the first hyperparameter combination is not greater than a preset quantity of times, and the quantity of times of evaluating the first hyperparameter combination is not greater than a quantity of times of evaluating a second hyperparameter combination, where the second hyperparameter combination is a hyperparameter combination with optimal performance in the plurality of hyperparameter combinations that is selected in any iterative evaluation, or a hyperparameter combination with a largest quantity of evaluations in the plurality of hyperparameter combinations; or a quantity of times of evaluating the first hyperparameter combination is greater than a preset quantity of times, the quantity of times of evaluating the first hyperparameter combination is not greater than a quantity of times of evaluating the second hyperparameter combination, and some performance results of the second hyperparameter combination are worse than at least one performance result of the first hyperparameter combination.

In a possible implementation, the evaluation module 902 is further configured to: determine whether a hyperparameter combination that meets the first preset condition exists in the plurality of hyperparameter combinations; if the first hyperparameter combination in the plurality of hyperparameter combinations does not meet the first preset condition, re-evaluate the second hyperparameter combination, to obtain a re-evaluated performance result of the second hyperparameter combination, where the re-evaluated performance result of the second hyperparameter combination is included in a plurality of performance results of the second hyperparameter combination.

In a possible implementation, the preset model includes a first probability density function and a second probability density function, and the updating module 904 is specifically configured to: classify the plurality of hyperparameter combinations into a first-type hyperparameter combination and a second-type hyperparameter combination based on the at least one performance result of each hyperparameter combination, where the plurality of performance results of the first-type hyperparameter combination are better than the plurality of performance results of the second-type hyperparameter combination; and update the first probability density function based on the first-type hyper-parameter combination, and update the second probability density function based on the second-type hyper-parameter combination.

In a possible implementation, a type of the first probability density function or the second probability density function may include: normal distribution, discrete distribution, truncated normal distribution, or log-normal distribution.

In a possible implementation, the neural network is a convolutional neural network for recognizing an image, a type of the hyperparameter in the hyperparameter search space includes one or more of the following: a quantity of convolutional layers, a quantity of convolution kernels, an expansion size, a location of a ReLU function in the neural network, a size of an anchor box, or a ratio of a length to a width of an anchor box, and the anchor box is used to identify an object that needs to be recognized in an image.

In a possible implementation, the neural network is obtained through combining one or more construction units, and the type of the hyperparameter in the hyperparameter search space includes one or more of the following: a quantity of network layers of one construction unit, a quantity of neurons at each network layer of a construction unit, or an operation operator of each neuron in a construction unit.

In a possible implementation, the plurality of performance results include classification precision or a loss value, the classification precision indicates accuracy of image recognition by the neural network, and the loss value is a value of a loss function corresponding to the neural network. The second preset condition includes: the classification precision in any one of the plurality of performance results is greater than a first threshold, an average value of the classification precision included in the plurality of performance results is greater than a second threshold, or the loss value is not greater than a third threshold.

In a possible implementation, the sampling module 901 is specifically configured to: randomly sample the hyperparameter search space, to obtain the plurality of hyperparameter combinations; or sample the hyperparameter search space based on the probability distribution determined by the preset model, to obtain the plurality of hyperparameter combinations, where the preset model is the model that is not updated.

Figure 10:
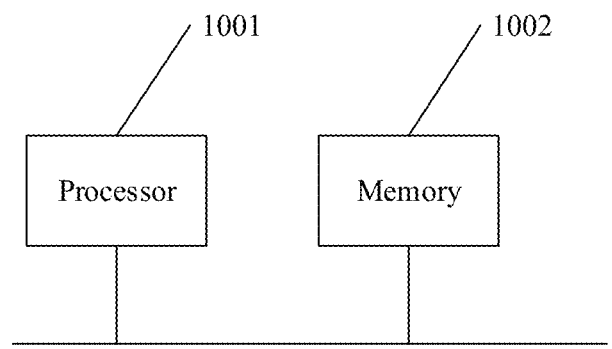
FIG. 10 is a schematic diagram of a structure of a neural network optimization apparatus according to an embodiment of this application.

FIG. 10 is a schematic diagram of a structure of another neural network optimization apparatus according to this application.

The neural network optimization apparatus may include a processor 1001 and a memory 1002. The processor 1001 and the memory 1002 are interconnected by using a line. The memory 1002 stores program instructions and data.

The memory 1002 stores the program instructions and the data corresponding to steps corresponding to FIG. 4, or FIG. 8.

The processor 1001 is configured to perform the method steps performed by the neural network optimization apparatus shown in any one of the foregoing embodiments in FIG. 4 or FIG. 8.

An embodiment of this application further provides a computer readable storage medium. The computer readable storage medium stores a program used to generate a vehicle travel speed. When the program is run on a computer, the computer is enabled to perform the steps in the methods described in the embodiments shown in FIG. 4 to FIG. 8.

Optionally, the neural network optimization apparatus shown in FIG. 10 is a chip.

An embodiment of this application further provides a neural network optimization apparatus. The neural network optimization apparatus may also be referred to as a digital processing chip or a chip. The chip includes a processing unit and a communication interface. The processing unit obtains program instructions through the communication interface, and when the program instructions are executed by the processing unit, the processing unit is configured to perform the method steps performed by the neural network optimization apparatus in any one of the foregoing embodiments in FIG. 4 or FIG. 8.

An embodiment of this application further provides a digital processing chip. A circuit and one or more interfaces that are configured to implement functions of the processor 1001 or the processor 1001 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through a communications interface. The digital processing chip implements, based on program code stored in the external memory, the actions performed by the neural network optimization apparatus in the foregoing embodiments.

An embodiment of this application further provides a computer program product. When the computer program product is run on a computer, the computer is enabled to perform the steps performed by the neural network optimization apparatus in the methods described in the embodiments shown in FIG. 4 to FIG. 8.

The neural network optimization apparatus in this embodiment of this application may be a chip. The chip includes a processing unit and a communications unit. The processing unit may be, for example, a processor, and the communications unit may be, for example, an input/output interface, a pin, or a circuit. The processing unit may execute computer-executable instructions stored in a storage unit, so that a chip in the server performs the neural network optimization method described in the embodiments shown in FIG. 4 to FIG. 8. Optionally, the storage unit is a storage unit in the chip, for example, a register or a cache; or the storage unit may be a storage unit that is in the radio access device end and that is located outside the chip, for example, a read-only memory (read-only memory, ROM), another type of static storage device that can store static information and instructions, or a random access memory (random access memory, RAM).

Specifically, the processing unit or the processor may be a Central Processing Unit (CPU), a Neural-network Processing Unit(NPU), a Graphics Processing Unit (GPU), a Digital Signal Processor (DSP), an Application-specific Integrated Circuit (ASIC), a field programmable gate array (FPGA), another programmable logic device, a discrete gate, a transistor logic device, a discrete hardware component, or the like. A general-purpose processor may be a microprocessor or any regular processor or the like.

Figure 11:
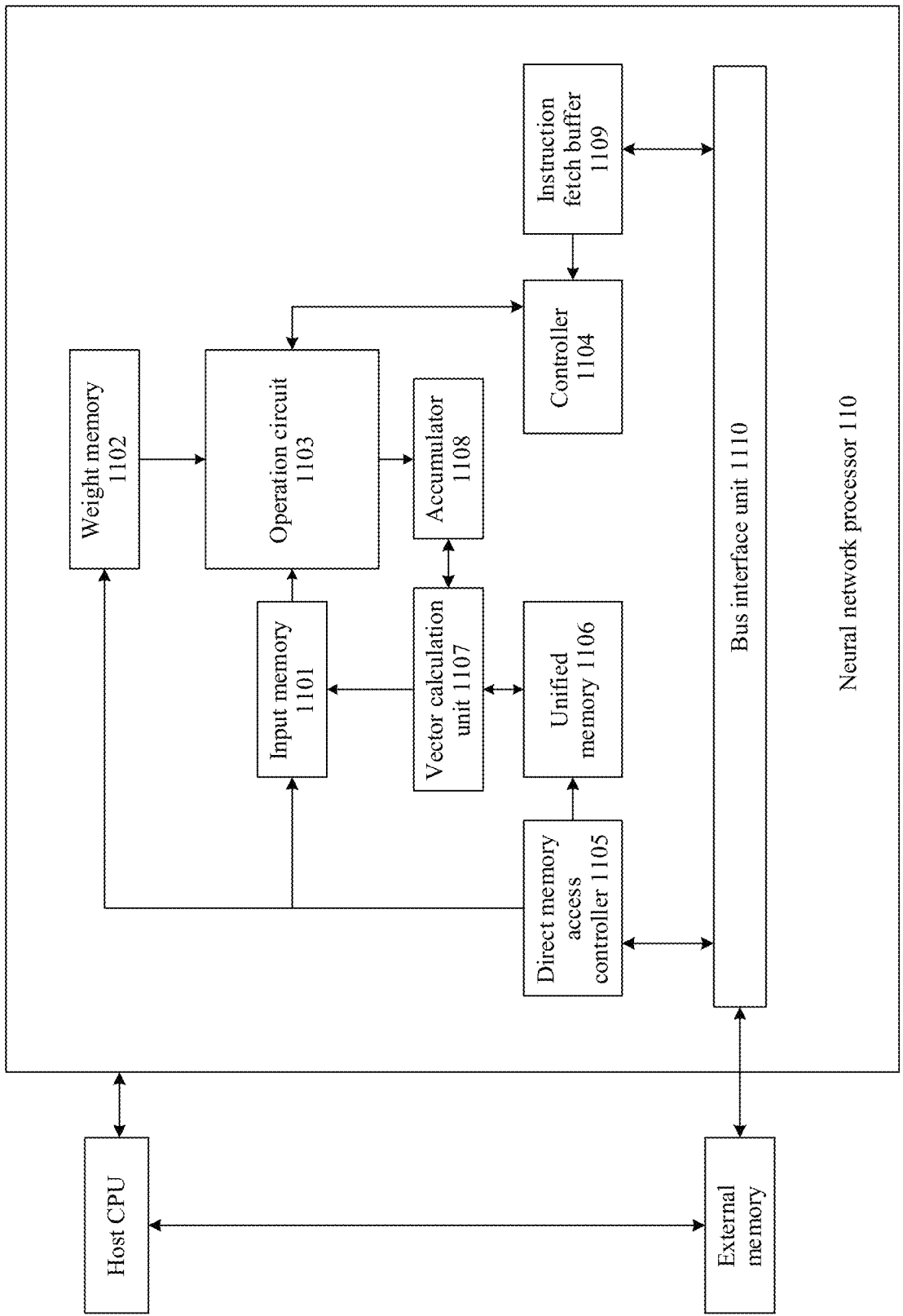
FIG. 11 is a schematic diagram of a structure of a chip according to an embodiment of this application.

Specifically, FIG. 11 is a schematic diagram of a structure of a chip according to an embodiment of this application. The chip may be represented as a neural network processing unit NPU 110. The NPU 110 is mounted to a host CPU as a coprocessor, and the host CPU allocates a task. A core part of the NPU is an operation circuit 1103, and a controller 1104 controls the operation circuit 1103 to extract matrix data in a memory and perform a multiplication operation.

In some implementations, the operation circuit 1103 includes a plurality of processing engines (process engine, PE) inside. In some implementations, the operation circuit 1103 is a two-dimensional systolic array. The operation circuit 1103 may alternatively be a one-dimensional systolic array or another electronic circuit capable of performing mathematical operations such as multiplication and addition. In some implementations, the operation circuit 1103 is a general-purpose matrix processor.

For example, it is assumed that there are an input matrix A, a weight matrix B, and an output matrix C. The operation circuit fetches, from a weight memory 1102, data corresponding to the matrix B, and caches the data on each PE in the operation circuit. The operation circuit fetches data of the matrix A from an input memory 1101, to perform a matrix operation on the matrix B, and stores an obtained partial result or an obtained final result of the matrix in an accumulator 1108.

A unified memory 1106 is configured to store input data and output data. The weight data is directly transferred to the weight memory 1102 by using a direct memory access controller (DMAC) 1105. The input data is also transferred to the unified memory 1106 by using the DMAC.

A bus interface unit (BIU) 1110 is configured to interact with the DMAC and an instruction fetch buffer (IFB) 1109 through an AXI bus.

The bus interface unit (BIU) 1110 is used by the instruction fetch buffer 1109 to obtain instructions from an external memory, and is further used by the direct memory access controller 1105 to obtain original data of the input matrix A or the weight matrix B from the external memory.

The DMAC is mainly configured to transfer input data in the external memory DDR to the unified memory 1106, or transfer the weight data to the weight memory 1102, or transfer the input data to the input memory 1101.

A vector calculation unit 1107 includes a plurality of operation processing units. If required, further processing is performed on an output of the operation circuit, for example, vector multiplication, vector addition, an exponential operation, a logarithmic operation, or size comparison. The vector calculation unit 1107 is mainly configured to perform network calculation at a non-convolutional/fully connected layer in a neural network, for example, batch normalization, pixel-level summation, and upsampling on a feature plane.

In some implementations, the vector calculation unit 1107 can store a processed output vector in a unified memory 1106. For example, the vector calculation unit 1107 may apply a linear function or a non-linear function to the output of the operation circuit 1103, for example, perform linear interpolation on a feature plane extracted at a convolutional layer. For another example, the linear function or the non-linear function is applied to a vector of an accumulated value to generate an activation value. In some implementations, the vector calculation unit 1107 generates a normalized value, a pixel-level summation value, or both. In some implementations, the processed output vector can be used as an activated input to the operation circuit 1103, for example, the processed output vector can be used at a subsequent layer of the neural network.

The instruction fetch buffer 1109 connected to the controller 1104 is configured to store instructions used by the controller 1104.

The unified memory 1106, the input memory 1101, the weight memory 1102, and the instruction fetch buffer 1109 are all on-chip memories. The external memory is private for the NPU hardware architecture.

An operation at each layer in the recurrent neural network may be performed by the operation circuit 1103 or the vector calculation unit 1107.

The processor mentioned above may be a general-purpose central processing unit, a microprocessor, an ASIC, or one or more integrated circuits for controlling program execution of the methods in FIG. 4 to FIG. 8.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on an actual requirement to achieve objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a Read-only Memory (ROM), a Random Access Memory (RAM), a magnetic disk, or an optical disc of a computer, and includes several instructions for instructing a computer device (which may be a personal computer, a server, a network device, or the like) to perform the methods described in the embodiments of this application.

All or some of the embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid-state Disk (SSD)), or the like.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Finally, it should be noted that the foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A neural network optimization method, comprising:
 sampling hyperparameter search space to obtain a plurality of hyperparameter combinations, wherein the hyperparameter search space comprises a hyperparameter of a neural network, and the hyperparameter indicates a parameter of the neural network obtained without training;

performing a plurality of iterative evaluations on the plurality of hyperparameter combinations to obtain a plurality of performance results of each hyperparameter combination of the plurality of hyperparameter combinations, wherein the plurality of performance results are determined based on a result output by the neural network after each hyperparameter combination is substituted into the neural network, and wherein any one of the plurality of iterative evaluations comprises:

obtaining at least one performance result of each hyperparameter combination that is obtained through evaluation before a current evaluation; and in response to determining that a first hyperparameter combination in the plurality of hyperparameter combinations meets a first preset condition, re-evaluating the first hyperparameter combination to obtain a re-evaluated performance result of the first hyperparameter combination, wherein the re-evaluated performance result is comprised in a plurality of performance results of the first hyperparameter combination;

determining an optimal hyperparameter combination from the plurality of hyperparameter combinations based on the plurality of performance results of each hyperparameter combination; and if the optimal hyperparameter combination does not meet a second preset condition, updating a preset model based on the plurality of performance results of each hyperparameter combination, wherein the preset model is used to fit probability distribution, and the probability distribution is used to resample the hyperparameter search space; or if the optimal hyperparameter combination meets a second preset condition, using the optimal hyperparameter combination as a hyperparameter combination of the neural network.

2. The method according to claim 1, wherein the first preset condition comprises:

a quantity of times of evaluating the first hyperparameter combination is not greater than a preset quantity of times nor a quantity of times of evaluating a second hyperparameter combination, wherein the second hyperparameter combination is a hyperparameter combination with optimal performance in the plurality of hyperparameter combinations that is selected in any iterative evaluation, or a hyperparameter combination with a largest quantity of evaluations in the plurality of hyperparameter combinations; or a quantity of times of evaluating the first hyperparameter combination is greater than a preset quantity of times and is not greater than a quantity of times of evaluating a second hyperparameter combination, and a portion of at least one performance result of the second hyperparameter combination is worse than at least one performance result of the first hyperparameter combination.

3. The method according to claim 1, wherein the any one of the plurality of iterative evaluations further comprises:

if the first hyperparameter combination in the plurality of hyperparameter combinations does not meet the first preset condition, re-evaluating a second hyperparameter combination to obtain a re-evaluated performance result of the second hyperparameter combination, wherein the re-evaluated performance result of the second hyperparameter combination is comprised in a plurality of performance results of the second hyperparameter combination.

4. The method according to claim 1, wherein the preset model comprises a first probability density function and a second probability density function, and the updating a preset model based on the plurality of performance results of each hyperparameter combination comprises:

classifying the plurality of hyperparameter combinations into a first-type hyperparameter combination and a second-type hyperparameter combination based on the plurality of performance results of each hyperparameter combination, wherein performance of the first-type hyperparameter combination is better than performance of the second-type hyperparameter combination, the performance of the first-type hyperparameter combination is determined based on a plurality of performance results of the first-type hyperparameter combination, and the performance of the second-type hyperparameter combination is determined based on a plurality of performance results of the second-type hyperparameter combination; and updating the first probability density function based on the first-type hyperparameter combination, and updating the second probability density function based on the second-type hyperparameter combination.

5. The method according to claim 4, wherein a type of the first probability density function or the second probability density function comprises one or more of the following: normal distribution, discrete distribution, truncated normal distribution, or log-normal distribution.

6. The method according to claim 1, wherein the neural network comprises a convolutional neural network for recognizing an image, a type of the hyperparameter in the hyperparameter search space comprises one or more of the following: a quantity of convolutional layers, a quantity of convolution kernels, an expansion size, a location of a rectified linear unit (ReLU) function in the neural network, a size of an anchor box, or a ratio of a length to a width of an anchor box, and the anchor box is used to identify an object that needs to be recognized in an image.

7. The method according to claim 1, wherein the neural network is obtained through combining one or more construction units, and a type of the hyperparameter in the hyperparameter search space comprises one or more of the following: a quantity of network layers of one construction unit, a quantity of neurons at each network layer of a construction unit, or an operation operator of each neuron in a construction unit.

8. The method according to claim 1, wherein the plurality of performance results comprise classification precision or a loss value, the classification precision indicates accuracy of image recognition by the neural network, and the loss value is a value of a loss function corresponding to the neural network; and the second preset condition comprises: the classification precision in any one of the plurality of performance results is greater than a first threshold, an average value of the classification precision comprised in the plurality of performance results is greater than a second threshold, or the loss value is not greater than a third threshold.

9. The method according to claim 1, wherein the sampling hyperparameter search space to obtain a plurality of hyperparameter combinations comprises:

randomly sampling the hyperparameter search space to obtain the plurality of hyperparameter combinations; or sampling the hyperparameter search space based on the probability distribution determined by the preset model to obtain the plurality of hyperparameter combinations.

10. A neural network optimization apparatus, comprising at least one processor and a communication interface, wherein the at least one processor obtains program instructions through the communication interface, and the program instructions, when executed by the at least one processor, cause the neural network optimization apparatus to perform operations comprising:
sampling hyperparameter search space to obtain a plurality of hyperparameter combinations, wherein the hyperparameter search space comprises a hyperparameter of a neural network, and the hyperparameter indicates a parameter of the neural network obtained without training;
performing a plurality of iterative evaluations on the plurality of hyperparameter combinations to obtain a plurality of performance results of each hyperparameter combination of the plurality of hyperparameter combinations, wherein the plurality of performance results are determined based on a result output by the neural network after each hyperparameter combination is substituted into the neural network, and wherein any one of the plurality of iterative evaluations comprises:
obtaining at least one performance result of each hyperparameter combination that is obtained through evaluation before a current evaluation; and
in response to determining that a first hyperparameter combination in the plurality of hyperparameter combinations meets a first preset condition, re-evaluating the first hyperparameter combination to obtain a re-evaluated performance result of the first hyperparameter combination, wherein the re-evaluated performance result is comprised in a plurality of performance results of the first hyperparameter combination;
determining an optimal hyperparameter combination from the plurality of hyperparameter combinations based on the plurality of performance results of each hyperparameter combination; and
if the optimal hyperparameter combination does not meet a second preset condition, updating a preset model based on the plurality of performance results of each hyperparameter combination, wherein the preset model is used to fit probability distribution, and the probability distribution is used to resample the hyperparameter search space; or
if the optimal hyperparameter combination meets a second preset condition, using the optimal hyperparameter combination as a hyperparameter combination of the neural network.

11. The apparatus according to claim 10, wherein the first preset condition comprises:
a quantity of times of evaluating the first hyperparameter combination is not greater than a preset quantity of times nor a quantity of times of evaluating a second hyperparameter combination, wherein the second hyperparameter combination is a hyperparameter combination with optimal performance in the plurality of hyperparameter combinations that is selected in any iterative evaluation, or a hyperparameter combination with a largest quantity of evaluations in the plurality of hyperparameter combinations; or
a quantity of times of evaluating the first hyperparameter combination is greater than a preset quantity of times and is not greater than a quantity of times of evaluating a second hyperparameter combination, and a portion of at least one performance result of the second hyperparameter combination is worse than at least one performance result of the first hyperparameter combination.

12. The apparatus according to claim 10, wherein the any one of the plurality of iterative evaluations further comprises:
if the first hyperparameter combination in the plurality of hyperparameter combinations does not meet the first preset condition, re-evaluating a second hyperparameter combination to obtain a re-evaluated performance result of the second hyperparameter combination, wherein the re-evaluated performance result of the second hyperparameter combination is comprised in a plurality of performance results of the second hyperparameter combination.

13. The apparatus according to claim 10, wherein the preset model comprises a first probability density function and a second probability density function, and the updating a preset model based on the plurality of performance results of each hyperparameter combination comprises:
classifying the plurality of hyperparameter combinations into a first-type hyperparameter combination and a second-type hyperparameter combination based on the plurality of performance results of each hyperparameter combination, wherein performance of the first-type hyperparameter combination is better than performance of the second-type hyperparameter combination, the performance of the first-type hyperparameter combination is determined based on a plurality of performance results of the first-type hyperparameter combination, and the performance of the second-type hyperparameter combination is determined based on a plurality of performance results of the second-type hyperparameter combination; and
updating the first probability density function based on the first-type hyperparameter combination, and updating the second probability density function based on the second-type hyperparameter combination.

14. The apparatus according to claim 13, wherein a type of the first probability density function or the second probability density function comprises one or more of the following: normal distribution, discrete distribution, truncated normal distribution, or log-normal distribution.

15. The apparatus according to claim 10, wherein the neural network comprises a convolutional neural network for recognizing an image, a type of the hyperparameter in the hyperparameter search space comprises one or more of the following: a quantity of convolutional layers, a quantity of convolution kernels, an expansion size, a location of a rectified linear unit (ReLU) function in the neural network, a size of an anchor box, or a ratio of a length to a width of an anchor box, and the anchor box is used to identify an object that needs to be recognized in an image.

16. The apparatus according to claim 10, wherein the neural network is obtained through combining one or more construction units, and a type of the hyperparameter in the hyperparameter search space comprises one or more of the following: a quantity of network layers of one construction unit, a quantity of neurons at each network layer of a construction unit, or an operation operator of each neuron in a construction unit.

17. The apparatus according to claim 10, wherein the plurality of performance results comprise classification precision or a loss value, the classification precision indicates accuracy of image recognition by the neural network, and the loss value is a value of a loss function corresponding to the neural network; and the second preset condition comprises: the classification precision in any one of the plurality of performance results is greater than a first threshold, an average value of the classification precision comprised in the plurality of performance results is greater than a second threshold, or the loss value is not greater than a third threshold.

18. The apparatus according to claim 10, wherein the sampling hyperparameter search space to obtain a plurality of hyperparameter combinations comprises:

randomly sampling the hyperparameter search space to obtain the plurality of hyperparameter combinations; or sampling the hyperparameter search space based on the probability distribution determined by the preset model to obtain the plurality of hyperparameter combinations.

19. A non-transitory computer-readable storage medium comprising a program which, when executed by at least one processor, causes the at least one processor to perform operations comprising:

sampling hyperparameter search space to obtain a plurality of hyperparameter combinations, wherein the hyperparameter search space comprises a hyperparameter of a neural network, and the hyperparameter indicates a parameter of the neural network obtained without training;

performing a plurality of iterative evaluations on the plurality of hyperparameter combinations to obtain a plurality of performance results of each hyperparameter combination of the plurality of hyperparameter combinations, wherein the plurality of performance results are determined based on a result output by the neural network after each hyperparameter combination is substituted into the neural network, and wherein any one of the plurality of iterative evaluations comprises:

obtaining at least one performance result of each hyperparameter combination that is obtained through evaluation before a current evaluation; and in response to determining that a first hyperparameter combination in the plurality of hyperparameter combinations meets a first preset condition, re-evaluating the first hyperparameter combination to obtain a re-evaluated performance result of the first hyperparameter combination, wherein the re-evaluated performance result is comprised in a plurality of performance results of the first hyperparameter combination;

determining an optimal hyperparameter combination from the plurality of hyperparameter combinations based on the plurality of performance results of each hyperparameter combination; and if the optimal hyperparameter combination does not meet a second preset condition, updating a preset model based on the plurality of performance results of each hyperparameter combination, wherein the preset model is used to fit probability distribution, and the probability distribution is used to resample the hyperparameter search space; or if the optimal hyperparameter combination meets a second preset condition, using the optimal hyperparameter combination as a hyperparameter combination of the neural network.

20. The non-transitory computer-readable storage medium according to claim 19, wherein the first preset condition comprises:

a quantity of times of evaluating the first hyperparameter combination is not greater than a preset quantity of times nor a quantity of times of evaluating a second hyperparameter combination, wherein the second hyperparameter combination is a hyperparameter combination with optimal performance in the plurality of hyperparameter combinations that is selected in any iterative evaluation, or a hyperparameter combination with a largest quantity of evaluations in the plurality of hyperparameter combinations; or a quantity of times of evaluating the first hyperparameter combination is greater than a preset quantity of times and is not greater than a quantity of times of evaluating a second hyperparameter combination, and a portion of at least one performance result of the second hyperparameter combination is worse than at least one performance result of the first hyperparameter combination.

* * * * *